US012801046B2

(12) United States Patent
Kamikura et al.

(10) Patent No.: US 12,801,046 B2
(45) Date of Patent: Nov. 17, 2026

(54) TONER AND METHOD FOR PRODUCING TONER

(71) Applicant: CANON KABUSHIKI KAISHA, Tokyo (JP)

(72) Inventors: Kenta Kamikura, Kanagawa (JP); Kosuke Fukudome, Tokyo (JP); Shohei Tsuda, Shizuoka (JP); Satoshi Arimura, Shizuoka (JP); Toru Ishii, Shizuoka (JP); Yuta Komiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 561 days.

(21) Appl. No.: 18/360,391

(22) Filed: Jul. 27, 2023

(65) Prior Publication Data

US 2024/0053691 A1 Feb. 15, 2024

(30) Foreign Application Priority Data

Aug. 4, 2022 (JP) ................................ 2022-124456
Jul. 12, 2023 (JP) ................................ 2023-114334

(51) Int. Cl.

| | |
|---|---|
| ***G03G 9/087*** | (2006.01) |
| ***C08F 212/08*** | (2006.01) |
| ***C08G 63/183*** | (2006.01) |
| ***G03G 9/083*** | (2006.01) |
| ***G03G 9/097*** | (2006.01) |

(52) U.S. Cl.

CPC ........ *G03G 9/08711* (2013.01); *C08F 212/08* (2013.01); *C08G 63/183* (2013.01); *G03G 9/0832* (2013.01); *G03G 9/08755* (2013.01); *G03G 9/09733* (2013.01)

(58) Field of Classification Search

CPC ............ G03G 9/08711; G03G 9/0832; G03G 9/08755; G03G 9/09733; C08F 212/08; C08G 63/183

See application file for complete search history.

(56) References Cited

U.S. PATENT DOCUMENTS

| | | | |
|---|---|---|---|
| 8,828,639 | B2 | 9/2014 | Kamikura |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,256,148 | B2 | 2/2016 | Fujikawa |
| 9,261,806 | B2 | 2/2016 | Moribe |
| 9,285,697 | B2 | 3/2016 | Fukudome |
| 9,470,993 | B2 | 10/2016 | Nishikawa |
| 9,575,425 | B2 | 2/2017 | Naka |
| 9,588,450 | B2 | 3/2017 | Tsuda |
| 9,594,323 | B2 | 3/2017 | Fujikawa |
| 9,606,462 | B2 | 3/2017 | Nomura |
| 9,658,546 | B2 | 5/2017 | Tanaka |
| 9,715,188 | B2 | 7/2017 | Terauchi |
| 9,772,570 | B2 | 9/2017 | Tsuda |
| 9,778,583 | B2 | 10/2017 | Terauchi |
| 9,804,519 | B2 | 10/2017 | Suzumura |
| 9,857,707 | B2 | 1/2018 | Tsuda |
| 9,880,478 | B2 | 1/2018 | Shimano |
| 9,904,195 | B2 | 2/2018 | Matsui |
| 9,927,728 | B2 | 3/2018 | Arimura |
| 9,946,179 | B2 | 4/2018 | Arimura |
| 9,952,523 | B2 | 4/2018 | Shimano |
| 9,971,263 | B2 | 5/2018 | Fukudome |
| 10,012,919 | B2 | 7/2018 | Matsui |
| 10,012,923 | B2 | 7/2018 | Sano |
| 10,101,683 | B2 | 10/2018 | Nishikawa |
| 10,156,800 | B2 | 12/2018 | Tsuda |
| 10,197,934 | B2 | 2/2019 | Matsui |
| 10,228,627 | B2 | 3/2019 | Nagashima |

(Continued)

FOREIGN PATENT DOCUMENTS

| | | | |
|---|---|---|---|
| EP | 3 125 044 | A1 | 2/2017 |
| JP | 2006-267298 | A | 10/2006 |

(Continued)

OTHER PUBLICATIONS

U.S. Appl. No. 18/354,735, Satoshi Arimura, filed Jul. 19, 2023.

(Continued)

*Primary Examiner* — Boone Alexander Evans

(74) *Attorney, Agent, or Firm* — VENABLE LLP

(57) ABSTRACT

A toner comprising a toner particle comprising a resin A and a resin B; wherein: the resin A is a vinyl resin having a sulfonic acid-type group, the resin B is a polyester resin; and when in analysis of the toner particle using time-of-flight secondary ion mass spectrometry, DA (nm) is defined as a depth at which an abundance of the resin A in a depth of 10 nm from a toner particle surface is a maximum, $CA_S$ (%) is defined as an abundance of the resin A at the depth DA, $CB_S$ (%) is defined as an abundance of the resin B at the depth DA, $CA_{75}$ (%) is defined as an abundance of the resin A at a depth of 75 nm and $CB_{75}$ (%) is defined as an abundance of the resin B at a depth of 75 nm, $CA_S$, $CA_{75}$, $CB_S$ and $CB_{75}$ satisfy specific relationships.

17 Claims, No Drawings

(56) References Cited

U.S. PATENT DOCUMENTS

| | | | |
|---|---|---|---|
| 10,289,016 | B2 | 5/2019 | Fukudome |
| 10,295,921 | B2 | 5/2019 | Ohmori |
| 10,303,074 | B2 | 5/2019 | Yamawaki |
| 10,310,396 | B2 | 6/2019 | Kamikura |
| 10,338,487 | B2 | 7/2019 | Kamikura |
| 10,345,726 | B2 | 7/2019 | Nakamura |
| 10,353,308 | B2 | 7/2019 | Hatakeyama |
| 10,401,750 | B2 | 9/2019 | Nakamura |
| 10,429,757 | B2 | 10/2019 | Yoshida |
| 10,503,090 | B2 | 12/2019 | Tominaga |
| 10,539,893 | B2 | 1/2020 | Tanaka |
| 10,539,899 | B2 | 1/2020 | Nakamura |
| 10,545,420 | B2 | 1/2020 | Kinumatsu |
| 10,545,422 | B2 | 1/2020 | Yamawaki |
| 10,551,758 | B2 | 2/2020 | Tanaka |
| 10,578,990 | B2 | 3/2020 | Tsuda |
| 10,635,010 | B2 | 4/2020 | Kamikura |
| 10,698,327 | B2 | 6/2020 | Nagashima |
| 10,732,530 | B2 | 8/2020 | Matsui |
| 10,782,623 | B2 | 9/2020 | Yoshiba |
| 10,845,722 | B2 | 11/2020 | Nishikawa |
| 10,859,933 | B2 | 12/2020 | Fukudome |
| 10,877,387 | B2 | 12/2020 | Kinumatsu |
| 10,877,388 | B2 | 12/2020 | Aoki |
| 10,877,389 | B2 | 12/2020 | Kamikura |
| 10,895,815 | B2 | 1/2021 | Kamikura |
| 10,976,678 | B2 | 4/2021 | Yamawaki |
| 11,003,103 | B2 | 5/2021 | Kinumatsu |
| 11,092,905 | B2 | 8/2021 | Fukudome |
| 11,099,493 | B2 | 8/2021 | Komiya |
| 11,112,708 | B2 | 9/2021 | Uratani |
| 11,112,712 | B2 | 9/2021 | Matsunaga |
| 11,169,458 | B2 | 11/2021 | Toyoizumi |
| 11,175,600 | B2 | 11/2021 | Uchiyama |
| 11,181,839 | B2 | 11/2021 | Yamashita |
| 11,181,840 | B2 | 11/2021 | Nagata |
| 11,181,844 | B2 | 11/2021 | Nagaoka |
| 11,181,846 | B2 | 11/2021 | Kinumatsu |
| 11,249,408 | B2 | 2/2022 | Tsuda |
| 11,256,187 | B2 | 2/2022 | Ogaki |
| 11,287,758 | B2 | 3/2022 | Matsui |
| 11,314,178 | B2 | 4/2022 | Kenmoku |
| 11,333,989 | B2 | 5/2022 | Unno |
| 11,347,157 | B2 | 5/2022 | Kamikura |
| 11,531,282 | B2 | 12/2022 | Kamikura |
| 2002/0009661 | A1 * | 1/2002 | Hashimoto ........ G03G 9/08708 430/110.3 |
| 2006/0216627 | A1 | 9/2006 | Mizutani |
| 2007/0269730 | A1 | 11/2007 | Lee et al. |
| 2015/0277251 | A1 | 10/2015 | Tominaga et al. |
| 2015/0286157 | A1 | 10/2015 | Masumoto et al. |
| 2016/0291495 | A1 | 10/2016 | Taguchi |
| 2019/0137900 | A1 * | 5/2019 | Nakagawa ......... G03G 9/08797 |
| 2019/0271926 | A1 * | 9/2019 | Kamikura .......... G03G 9/08711 |
| 2022/0026823 | A1 | 1/2022 | Sano et al. |
| 2022/0146952 | A1 | 5/2022 | Komiya |
| 2022/0146955 | A1 | 5/2022 | Nozaki |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0291601 | A1 | 9/2022 | Katsura |
| 2023/0042289 | A1 | 2/2023 | Tanaka |
| 2023/0047510 | A1 | 2/2023 | Tsuda |
| 2023/0080900 | A1 | 3/2023 | Kamikura |
| 2023/0117448 | A1 | 4/2023 | Fukudome |
| 2023/0122974 | A1 | 4/2023 | Kagawa |
| 2023/0161277 | A1 | 5/2023 | Komiya |
| 2023/0273538 | A1 | 8/2023 | Fukudome |
| 2023/0314974 | A1 | 10/2023 | Tsuda |

FOREIGN PATENT DOCUMENTS

| | | | |
|---|---|---|---|
| JP | 2009-186724 | A | 8/2009 |
| JP | 2013-214005 | A | 10/2013 |
| JP | 2016-66048 | A | 4/2016 |
| JP | 2019-70835 | A | 5/2019 |
| JP | 2020-148941 | A | 9/2020 |
| JP | 2022-22128 | A | 2/2022 |
| KR | 10-2009-0076165 | | 7/2009 |
| WO | 2013/063291 | A1 | 5/2013 |

OTHER PUBLICATIONS

U.S. Appl. No. 18/360,142, Yuta Komiya, filed Jul. 27, 2023

Robert F. Fedors, “A Method for Estimating Both the Solubility Parameters and Molar Volumes of Liquids”, Polymer Engineering and Science, vol. 14, No. 2, 147-154.

* cited by examiner

TONER AND METHOD FOR PRODUCING TONER

BACKGROUND OF THE INVENTION

Field of the Invention

The present disclosure relates to the toner used in recording methods that utilize an electrophotographic method, electrostatic recording method, or a toner jet system recording method, and relates to a method for producing toner.

Description of the Related Art

In recent years, the use environment for electrophotographic system-based image-forming methods has not been limited to environments in which the temperature and humidity are controlled, as is typical of office environments, but has also been broadening into environments where the temperature and humidity are not controlled, e.g., outside environments.

Image formation is carried out in an electrophotographic system through transport of a charge-bearing toner based on a potential difference. The temperature/humidity conditions influence the charge quantity retained by the toner, and due to this, investigations have been carried out into toner that can retain a stable charge quantity even when the temperature and/or humidity change.

The incorporation in toner of a charge control resin (also referred to as a "CCR" in the following), which has a charged segment present in a resin, has been commonly pursued as a means for controlling the charge quantity in toner.

Japanese Patent Application Publication No. 2019-070835 discloses a suspension-polymerized toner that has a sulfonic acid group-bearing vinyl polymer as a charge control resin and a monoester compound as a softening agent.

Japanese Patent Application Publication No. 2006-267298 discloses an emulsion-aggregated toner that contains a sulfonic acid group-bearing polyester resin.

SUMMARY OF THE INVENTION

However, it has been found that the toner described in Japanese Patent Application Publication No. 2019-070835 readily exhibits a decline in charge quantity during storage in a high-temperature, high-humidity environment. As a consequence, when, for example, image formation is carried out after extended standing in a high-temperature, high-humidity environment, e.g., as during an extended vacation, the toner must be charged using a sequence such as pre-rotation, which is connected to a reduction in the First Print Output Time (FPOT).

Similarly, the toner described in Japanese Patent Application Publication No. 2006-267298 also readily exhibits a decline in charge quantity during storage in a high-temperature, high-humidity environment.

Thus, CCR-containing toners have exhibited the disadvantage of a decline in the charge quantity after storage in a high-temperature, high-humidity environment, and additional improvements are required.

At least one aspect of the present disclosure is directed to providing a toner that can retain a favorable charge quantity on a long-term basis even in a high-temperature, high-humidity environment; at least one aspect of the present disclosure is also directed to providing a method for producing toner.

According to at least one aspect of the present disclosure, there is provided a toner comprising a toner particle, the toner particle comprising a resin A and a resin B; wherein:

the resin A is a vinyl resin having at least one sulfonic acid-type group selected from the group consisting of a sulfonic acid group, a sulfonate salt group, and a sulfonate ester group;

the resin B is a polyester resin; and when in analysis in a depth direction of the toner particle using time-of-flight secondary ion mass spectrometry, DA (nm) is defined as a depth at which an abundance of the resin A in a depth of 10 nm from a toner particle surface is a maximum, $CA_S$ (%) is defined as an abundance of the resin A at the depth DA, $CB_S$ (%) is defined as an abundance of the resin B at the depth DA, in each case calculated from a spectrum for the depth DA, $CA_{75}$ (%) is defined as an abundance of the resin A at a depth of 75 nm and $CB_{75}$ (%) is defined as an abundance of the resin B at a depth of 75 nm, in each case calculated from a spectrum for a depth of 75 nm, $CA_S$ is 40.0 to 85.0, $CA_S/CA_{75}$ is 1.5 to 5.0, $CB_S/CB_{75}$ is 1.5 to 5.0, $CA_S/CB_S$ is 1.0 to 6.0, and $(CA_S/CB_S)/(CA_{75}/CB_{75})$ is 0.5 to 3.0.

According to at least one aspect of the present disclosure, there is provided a toner that can retain a favorable charge quantity on a long-term basis even in a high-temperature, high-humidity environment.

Further features of the present invention will become apparent from the following description of exemplary embodiments.

DESCRIPTION OF THE EMBODIMENTS

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily.

The term "monomer unit" describes a reacted form of a monomeric material in a polymer, and one carbon-carbon bonded section in a principal chain of polymerized vinyl-based monomers in a polymer is given as one unit. The vinyl-based monomer can be represented by the following formula (C).

(C)

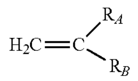

In formula (C), $R_A$ represents a hydrogen atom or alkyl group (preferably an alkyl group having 1 to 3 carbon atoms, or more preferably a methyl group), and RB represents any substituent.

The present disclosure relates to a toner comprising a toner particle, the toner particle comprising a resin A and a resin B; wherein:

the resin A is a vinyl resin having at least one sulfonic acid-type group selected from the group consisting of a sulfonic acid group, a sulfonate salt group, and a sulfonate ester group;

the resin B is a polyester resin; and when in analysis in a depth direction of the toner particle using time-of-flight secondary ion mass spectrometry, DA (nm) is defined as a depth at which an abundance of the resin A in a depth of 10 nm from a toner particle surface is a maximum, $CA_S$ (%) is defined as an abundance of the resin A at the depth DA, $CB_S$ (%) is defined as an abundance of the resin B at the depth DA, in each case calculated from a spectrum for the depth DA, $CA_{75}$ (%) is defined as an abundance of the resin A at a depth of 75 nm and $CB_{75}$ (%) is defined as an abundance of the resin B at a depth of 75 nm, in each case calculated from a spectrum for a depth of 75 nm, $CA_S$ is 40.0 to 85.0, $CA_S/CA_{75}$ is 1.5 to 5.0, $CB_S/CB_{75}$ is 1.5 to 5.0, $CA_S/CB_S$ is 1.0 to 6.0, and $(CA_S/CB_S)/(CA_{75}/CB_{75})$ is 0.5 to 3.0.

The present inventors hypothesize as follows with regard to the factors that enable this toner to retain a favorable charge quantity on a long-term basis even in a high-temperature, high-humidity environment.

Toner that has a charge control resin (CCR)-containing toner particle can retain charge at the charged segments in the CCR.

Toner generally has charge at the surface, and as a consequence toner having a conventional CCR-containing toner particle has generally had a design in which the CCR is skewed to the surface of the toner particle. However, when charge is present only at the surface of the toner particle, the charge at the toner particle surface leaks under the influence of the moisture in environments in which the effects of moisture are prone to appear, e.g., high temperatures and high humidities, and this ultimately facilitates a reduction in the amount of charge.

On the other hand, charge can be retained in the toner particle interior when the CCR is also distributed into the interior of the toner particle. However, when charge at the toner particle surface is lost, the charge present in the toner particle interior cannot migrate to the toner particle surface and as a consequence the charge present in the toner particle interior cannot be effectively utilized.

These factors then ultimately result in a decline in the charge quantity for a conventional CCR-containing toner in a high-temperature, high-humidity environment.

The present inventors then thought that this problem could be solved if the CCR could be distributed at the toner particle surface and in the toner particle interior and in addition if the charge retained by the CCR in the toner particle interior could be made transferable to the toner particle surface. Charge transport from charged segment to charged segment is thought to be necessary to bring about transfer of the charge retained by the CCR in the toner particle interior.

As a result of intensive investigations, the present inventors discovered that, when a vinyl resin having a sulfonic acid-type group as the charged segment is used as the CCR, the ester bond present in a polyester resin can engage in charge transport. It was also discovered that the effective transfer of charge in the toner particle interior toward the toner particle surface can be brought about by controlling the concentration gradients of the CCR and polyester resin in the interior from the neighborhood of the toner particle surface.

Considered in greater detail, the following are necessary: the concentration of the CCR and polyester resin at the toner particle surface and neighborhood thereof (depth to 10 nm from the surface) must be high, and concentration gradients must be present whereby the concentrations decline toward the direction of the toner particle center. When, in this case, the inclinations of the concentration gradients of the CCR and polyester resin are close to each other, the charge possessed by the charged segments of the CCR in the toner particle interior can effectively transfer toward the toner particle surface.

By having the charged segments and charge transport segments each have a concentration gradient from the toner particle interior toward the toner particle surface, when the toner particle surface direction and toner particle center direction are compared from the standpoint that gradients are present, the charge retention capability and the charge transport capability increase in the direction of the toner particle surface. Due to this, a driving force is produced for charge transfer in the toner particle surface direction and an effective charge transfer is readily brought about.

However, when the CCR concentration gradient is substantially different from the polyester resin concentration gradient, a mismatch is produced in the ratio between the charged segments and charge transport segments and a smooth charge transfer to the toner particle surface is then impaired. Due to this, the relationship must be controlled so as to avoid a substantial divergence between the CCR concentration gradient and the polyester resin concentration gradient.

Thus, in addition to creating CCR and polyester resin concentration gradients whereby the concentrations decline from the toner particle surface toward the center, an effective transfer of the charge in the toner particle interior toward the toner particle surface is made possible by controlling the relationship between these concentration gradients.

The parameters pertaining to the concentration gradients are described in detail in the following.

In analysis in the depth direction of the toner particle using time-of-flight secondary ion mass spectrometry, DA (nm) is defined as the depth, from the toner particle surface to a depth of 10 nm therefrom, at which the abundance of the resin A is a maximum. $CA_S$ (%) is defined as the abundance of the resin A at the depth DA and $CB_S$ (%) is defined as the abundance of the resin B at the depth DA, in each case calculated from the spectrum for the depth DA. In addition, $CA_{75}$ (%) is defined as the abundance of the resin A at a depth of 75 nm and $CB_{75}$ (%) is defined as the abundance of the resin B at a depth of 75 nm, in each case calculated from the spectrum for a depth of 75 nm.

Using these definitions, $CA_S$ (%) is 40.0 to 85.0.

$CA_S$ represents the abundance of the CCR in the vicinity (depth to 10 nm from the surface) of the toner particle surface. The charge quantity for the toner is brought into an advantageous range by having $CA_S$ be 40.0 to 85.0. 50.0 to 80.0 is preferred and 60.0 to 75.0 is more preferred.

$CA_S$ can be increased by increasing the amount of the CCR incorporated in the toner particle. In addition, $CA_S$ can be reduced by lowering the amount of CCR incorporated in the toner particle.

$CA_S/CA_{75}$ is 1.5 to 5.0.

$CA_S/CA_{75}$ represents the value of the ratio of the abundance of the CCR in the vicinity of the toner particle surface to the abundance of the CCR at a depth of 75 nm from the toner particle surface. $CA_S/CA_{75}$ can be controlled into a favorable range by disposing the CCR such that, considered in the depth direction from the toner particle surface, it has a concentration gradient whereby it has a higher concentration closer to the toner particle surface and the concentration declines as the depth increases. This makes it possible for the toner to retain charge in the interior and not just at the surface.

In specific terms, $CA_S/CA_{75}$ can be increased by increasing the polarity of the sulfonic acid-type group in the CCR and/or by increasing the amount of the sulfonic acid-type group in the CCR. In addition, $CA_S/CA_{75}$ can be reduced by lowering the polarity of the sulfonic acid-type group in the CCR and/or by reducing the amount of the sulfonic acid-type group in the CCR.

$CA_S/CA_{75}$ is 1.5 to 5.0 and is preferably 2.0 to 5.0 and more preferably 3.0 to 4.5.

$CA_{75}$ (%) is preferably 12.0 to 32.0 and is more preferably 14.0 to 27.0.

$CB_S/CB_{75}$ is 1.5 to 5.0.

$CB_S/CB_{75}$ represents the value of the ratio of the abundance of the polyester resin in the vicinity of the toner particle surface to the abundance of the polyester resin at a depth of 75 nm from the toner particle surface. $CB_S/CB_{75}$ can be controlled into a favorable range by disposing the polyester resin such that, considered in the depth direction from the toner particle surface, it has a concentration gradient whereby it has a higher concentration closer to the toner particle surface and the concentration declines as the depth increases. This makes it possible for the charge retained in the toner particle interior to undergo transfer.

In specific terms, $CB_S/CB_{75}$ can be increased by increasing the pH in the heat treatment step described below and/or by increasing the acid value of the polyester resin. In addition, $CB_S/CB_{75}$ can be reduced by reducing the pH in the heat treatment step described below and/or by reducing the acid value of the polyester resin.

$CB_S/CB_{75}$ is 1.5 to 5.0 and is preferably 1.5 to 4.0 and more preferably 2.0 to 3.5.

$CB_S$ (%) is preferably 14.0 to 50.0 and is more preferably 15.0 to 37.0.

$CB_{75}$ (%) is preferably 5.0 to 35.0 and is more preferably 7.0 to 15.0.

$CA_S/CB_S$ is 1.0 to 6.0.

$CA_S/CB_S$ represents the value of the ratio, in the vicinity of the toner particle surface, of the abundance of the CCR to the abundance of the polyester resin. The charge quantity on the toner is brought into an advantageous range by having $CA_S/CB_S$ be 1.0 to 6.0. $CA_S/CB_S$ is preferably 1.5 to 5.5 and is more preferably 2.0 to 5.0.

$CA_S/CB_S$ can be increased by controlling the ratio between the CCR and polyester resin and/or by lowering the pH in the heat treatment step described below. $CA_S/CB_S$ can be reduced by controlling the ratio between the CCR and polyester resin and/or by raising the pH in the heat treatment step described below.

$(CA_S/CB_S)/(CA_{75}/CB_{75})$ is 0.5 to 3.0.

$(CA_S/CB_S)/(CA_{75}/CB_{75})$ represents the relationship between the following: the ratio, in the vicinity of the toner particle surface, of the abundance of the CCR to the abundance of the polyester resin, and the ratio, at a depth of 75 nm from the toner particle surface, of the abundance of the CCR to the abundance of the polyester resin. That is, the residence of $(CA_S/CB_S)/(CA_{75}/CB_{75})$ in the cited range indicates that the relationship between the CCR abundance and polyester resin abundance does not undergo a large divergence between the vicinity of the toner particle surface and a depth of 75 nm.

$(CA_S/CB_S)/(CA_{75}/CB_{75})$ can be controlled into a preferred range by disposing the CCR and polyester with the same or similar concentration gradients in the depth direction from the toner particle surface. Specifically, $(CA_S/CB_S)/(CA_{75}/CB_{75})$ can be controlled by controlling the previously discussed $CA_S/CA_{75}$, $CB_S/CB_{75}$, and $CA_S/CB_S$.

$(CA_S/CB_S)/(CA_{75}/CB_{75})$ is 0.5 to 3.0 and is preferably 1.0 to 3.0 and more preferably 1.5 to 2.5.

The starting materials that can be used for the toner are described in the following.

The toner contains a toner particle. The toner particle comprises the resin A and the resin B. The toner particle preferably also comprises the resin C.

Resin A

The resin A is a vinyl resin that has at least one sulfonic acid-type group selected from the group consisting of the sulfonic acid group, sulfonate salt group, and sulfonate ester group. It is preferably a vinyl resin having at least one sulfonic acid-type group selected from the group consisting of the sulfonic acid group and sulfonate ester group. Known sulfonic acid-type group-bearing vinyl resins can be used without particular limitation.

In particular, the resin A is preferably a copolymer from a monomer mixture comprising a sulfonic acid-type group-bearing vinyl monomer (referred to as a sulfonic acid-type group-containing monomer in the following) as described in the following and a styrene monomer and/or (meth)acrylate ester monomer as described in the following.

The concentration of the sulfonic acid-type group in the resin A is preferably 0.05 to 0.50 mmol/g and is more preferably 0.10 to 0.30 mmol/g. When the concentration of the sulfonic acid-type group in the resin A is in the indicated range, the concentration gradient-related parameters described above are then easily brought into the ranges indicated above and the charge quantity for the toner can also be controlled into a favorable range.

The resin A is preferably an amorphous resin. By having the resin A be an amorphous resin, its conductivity is then easily kept low and charge leakage to outside the toner is suppressed as a consequence. The charge quantity on the toner can be controlled into a more advantageous range for that reason.

The sulfonic acid group can be represented by $—SO_3H$.

The sulfonate salt group can be exemplified by the monovalent cation salts of the sulfonic acid group. The monovalent cation is preferably any selection from $Li^+$, $Na^+$, $K^+$, and quaternary ammonium cations. The quaternary ammonium cations can be exemplified by the tetramethylammonium cation and ethyltrimethylammonium cation.

The sulfonate ester group can be exemplified by alkylsulfonyl groups having 1 to 6 carbon atoms, e.g., the methanesulfonyl group, ethanesulfonyl group, and hexanesulfonyl group.

Sulfonic Acid-Type Group-Containing Monomer

Known sulfonic acid-type group-containing monomers can be used without particular limitation as the sulfonic acid-type group-containing monomer used for the resin A. The following are specific examples: vinylsulfonic acid, 2-methyl-2-propene-1-sulfonic acid, 2-acrylamido-2-methylpropanesulfonic acid, 2-acrylaminomethylsulfonic acid, 2-acrylamidoethylsulfonic acid, 2-acrylamidobenzenesulfonic acid, 4-acrylamidobenzenesulfonic acid, and 2-acrylamido-5-methoxybenzenesulfonic acid and their methyl esters, ethyl esters, isopropyl esters, lithium salts, sodium salts, and potassium salts. The esters can be exemplified by the alkyl esters (preferably $C_{1-3}$) of styrenesulfonic acid, e.g., ethyl p-styrenesulfonate. Each of these sulfonic acid-type group-containing monomers may be used by itself, or combinations of two or more may be used.

The resin A preferably has a monomer unit provided by at least one monomer selected from the group consisting of the sulfonic acid-type group-containing monomers described in the preceding. The resin A more preferably has a monomer unit provided by 2-acrylamido-2-methylpropanesulfonic acid. The proportion in the resin A of monomer unit provided by sulfonic acid-type group-containing monomer is preferably 0.5 to 15.0 mass % and is more preferably 1.2 to 12.0 mass %.

Styrene Monomer

Heretofore known styrene monomers can be used without particular limitation as the styrene monomer used for the resin A. Specific examples are styrene and α-methylstyrene. The resin A preferably has a monomer unit derived from styrene. The proportion of the styrene-derived monomer unit in the resin A is preferably 60.0 to 95.0 mass % and more preferably 75.0 to 90.0 mass %.

(Meth)Acrylate Ester Monomer

Known (meth)acrylate ester monomers can be used without particular limitation as the (meth)acrylate ester monomer used for the resin A. Specific examples are as follows: acrylate esters such as methyl acrylate and n-butyl acrylate, and methacrylate esters such as methyl methacrylate, 2-hydroxyethyl methacrylate, t-butyl methacrylate, and 2-ethylhexyl methacrylate.

Preferred are alkyl (meth)acrylate esters in which the alkyl group has 1 to 8 (more preferably 2 to 6) carbon atoms. n-butyl acrylate is more preferred. The resin A preferably has a monomer unit derived from a (meth)acrylate ester monomer. The proportion of (meth)acrylate ester monomer-derived monomer unit in the resin A is preferably 2.0 to 20.0 mass % and more preferably 8.0 to 15.0 mass %.

Other Vinyl Monomer

Other known vinyl monomers may be used in the resin A in addition to the sulfonic acid-type group-containing monomer, styrene monomer, and (meth)acrylate ester monomer. That is, the resin A may have a monomer unit derived from this other vinyl monomer in addition to monomer units derived from sulfonic acid-type group-containing monomer, styrene monomer, and (meth)acrylate ester monomer.

The following are specific examples: monofunctional monomers having one polymerizable unsaturated bond in the molecule, e.g., unsaturated carboxylic acids such as acrylic acid and methacrylic acid, unsaturated dicarboxylic acids such as maleic acid, unsaturated dicarboxylic acid anhydrides such as maleic anhydride, nitrile-type vinyl monomers such as acrylonitrile, halogen-containing vinyl monomers such as vinyl chloride, and nitro-type vinyl monomers such as nitrostyrene; and also multifunctional monomers having a plurality of polymerizable unsaturated bonds in the molecule, e.g., divinylbenzene, 1,6-hexanediol diacrylate, 1,9-nonanediol diacrylate, and trimethylolpropane tri(meth)acrylate.

Resin B

Known polyester resins can be used without particular limitation as the resin B. The polyester resin is preferably a condensation polymer from an acid component and an alcohol component. Among these, the polyester resin is preferably a condensation polymer from a monomer mixture comprising a diol and a dicarboxylic acid having a structure in which the carboxy group is directly bonded to an aromatic ring. A structure in which the carboxy group is directly bonded to an aromatic ring forms a broad, aromatic ring-containing conjugated structure from the ester bond segment, and as a consequence the occurrence of charge transfer via the π-electron cloud spread over the conjugated structure is facilitated. The charge transferability can be further raised as a result.

The concentration of the ester group in the resin B is preferably 2.0 to 10.0 mmol/g and is more preferably 3.0 to 8.0 mmol/g. When the concentration of the ester group in the resin B is in the indicated range, the concentration gradient-related parameters described above are then easily brought into the ranges indicated above and the charge transferability in the toner particle can also be controlled into a favorable range.

In addition, the acid value of the resin B is preferably 1.0 to 30.0 mg KOH/g, more preferably 2.0 to 20.0 mg KOH/g, and still more preferably 3.0 to 1.0 mg KOH/g.

The resin B is preferably an amorphous resin. By having the resin B be an amorphous resin, the conductivity of the resin B as a whole is then easily kept low and charge leakage to outside the toner by pathways different from the expected charge transfer is suppressed. The charge quantity on the toner can be controlled into a more advantageous range for that reason. An amorphous resin is a resin that does not present a clear endothermic peak in differential scanning calorimetric measurement.

Dicarboxylic Acid

Known dicarboxylic acids can be used without particular limitation as the dicarboxylic acid used for the resin B. Among these, the use is preferred of dicarboxylic acids having a structure in which the carboxy group is directly bonded to an aromatic ring, as described above.

Specific examples are aromatic dicarboxylic acids, e.g., terephthalic acid, isophthalic acid, phthalic acid, and naphthalenedicarboxylic acid. Also usable are alkyl dicarboxylic acids such as succinic acid, adipic acid, sebacic acid, and azelaic acid, and their anhydrides; succinic acid substituted by an alkyl group or alkenyl group having from 6 to 18 carbon atoms, and their anhydrides; and unsaturated dicarboxylic acids such as fumaric acid, maleic acid, citraconic acid, and itaconic acid, and their anhydrides.

A tribasic or higher basic carboxylic acid compound may be used in combination with the dicarboxylic acid, and examples of the former are trimellitic acid, trimellitic anhydride, and pyromellitic acid.

The proportion of aromatic dicarboxylic acid-derived monomer unit in the resin B is preferably 30 to 60 mol % and more preferably 40 to 55 mol %.

Diol

Heretofore known diols can be used without particular limitation as the diol used for resin B. Specific examples are as follows: ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexanedimethanol, butenediol, octenediol, cyclohexenedimethanol, hydrogenated bisphenol A, bisphenol derivatives represented by formula (A), hydrogenates of compounds represented by the following formula (A), diols represented by the following formula (B), and diols that are hydrogenates of compounds with formula (B).

(A)

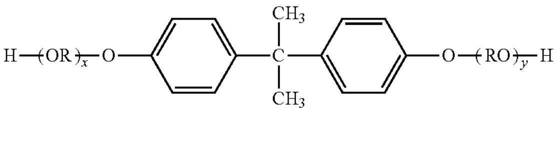

In formula (A), R is an ethylene group or propylene group, x and y are each integers equal to or greater than 1, and the average value of x+y is 2 to 10.

(B)

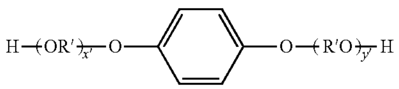

(In the formula, R' is $-CH_2CH_2-$,

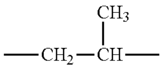
, or
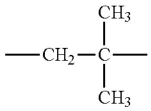
;

x' and y' are each integers equal to or greater than 0; and the average value of x'+y' is 0 to 10.)

The aforementioned alkylene oxide adducts on bisphenol A, which provide excellent charging characteristics and an excellent environmental stability, and which achieve a balance for the other electrophotographic properties, are particularly preferred for the dihydric alcohol component.

From the standpoint of the fixing performance and toner durability, the average number of moles of addition of the alkylene oxide with these compounds is preferably from 2 to 10.

The resin B preferably has a monomer unit derived from an alkylene oxide adduct on bisphenol A and a monomer unit derived from ethylene glycol.

The proportion of monomer unit derived from an alkylene oxide adduct on bisphenol A in the resin B is preferably 30 to 60 mol % and more preferably 40 to 55 mol %.

Of the resins constituting the toner, the proportion for the resin A is preferably 0.1 to 5.0 mass % and more preferably 0.3 to 2.0 mass %.

Of the resins constituting the toner, the proportion for the resin B is preferably 1.0 to 20.0 mass % and more preferably 2.0 to 10.0 mass %.

Resin C

The toner particle preferably contains a resin C. The resin C is a vinyl resin that does not have a sulfonic acid-type group. The resin C preferably is a vinyl resin that has a monomer unit represented by the following formula (1).

(1)

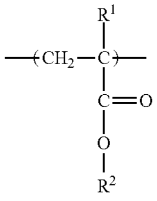

(In formula (1), $R^1$ represents a hydrogen atom or methyl group and $R^2$ represents a straight-chain alkyl group having 10 to 14 carbon atoms.)

Of the resins constituting the toner, the resin C preferably takes up at least 50 mass %. 80 to 99 mass % is preferred and 90 to 98 mass % is more preferred. Component C may be a binder resin.

Monomers that Form Monomer Unit with Formula (1)

Known polymerizable monomers can be used without particular limitation as the polymerizable monomer that forms the monomer unit represented by formula (1). Specific examples are as follows: acrylate esters and methacrylate esters such as decyl acrylate, decyl methacrylate, lauryl acrylate, lauryl methacrylate, myristyl acrylate, and myristyl methacrylate. The use of lauryl acrylate or lauryl methacrylate among the preceding is preferred.

The proportion of monomer unit with formula (1) in the resin C is preferably 1.0 to 15.0 mass % and more preferably 4.0 to 10.0 mass %.

Other Monomers

In addition to monomers that form the unit with the formula (1) given above, monomers such as the styrene monomers, (meth)acrylate ester monomers, other monomers, and so forth provided in the section on the resin A can be used without particular limitation as monomers used for the resin C.

The resin C preferably has a styrene-derived monomer unit. The proportion of the styrene-derived monomer unit in the resin C is preferably 60.0 to 90.0 mass % and more preferably 75.0 to 85.0 mass %.

The resin C preferably has a (meth)acrylate ester monomer-derived monomer unit. The (meth)acrylate ester monomers described above for the resin A can be used. The proportion of the (meth)acrylate ester monomer-derived monomer unit in the resin C is preferably 5.0 to 25.0 mass % and more preferably 10.0 to 20.0 mass %.

Other Resins

The toner particle may contain, as a binder resin, a resin other than the resin A, resin B, and resin C. Known resins can be used without particular limitation as this resin. Specific examples are polyurethane resins and polyamide resins.

Plasticizer

A plasticizer is preferably used in the toner particle. The waxes known for use in toners, such as described below, can be used without particular limitation as this plasticizer. The toner particle preferably contains an ester wax.

The ester wax preferably is at least one compound selected from the group consisting of compounds represented by the following formula (4), compounds represented by the following formula (5), and compounds represented by the following formula (6). Compounds represented by formula (6) are more preferred.

(4)

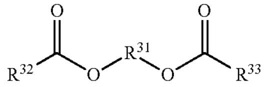

(5)

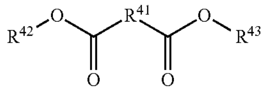

(6)

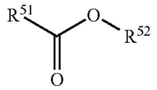

In formulas (4), (5), and (6), $R^{31}$ and $R^{41}$ each independently represent an alkylene group having 2 to 8 carbon atoms, and $R^{32}$, $R^{33}$, $R^{42}$, $R^{43}$, $R^{51}$, and $R^{52}$ each independently represent a straight-chain alkyl group having 14 to 24 (more preferably 16 to 24) carbon atoms.

The ester wax can be specifically exemplified by esters of a monohydric alcohol with an aliphatic carboxylic acid, or esters of a monobasic carboxylic acid with an aliphatic alcohol, e.g., behenyl behenate, stearyl stearate, behenyl stearate, stearyl behenate, and palmityl palmitate, and by esters of a dihydric alcohol with an aliphatic carboxylic acid, or esters of a dibasic carboxylic acid with an aliphatic alcohol, e.g., ethylene glycol distearate, dibehenyl sebacate, and hexanediol dibehenate.

Other examples are esters between a trihydric alcohol and an aliphatic carboxylic acid, or esters between a tribasic carboxylic acid and an aliphatic alcohol, such as glycerol tribehenate; esters between a tetrahydric alcohol and an aliphatic carboxylic acid, or esters between a tetrabasic carboxylic acid and an aliphatic alcohol, such as pentaerythritol tetrastearate and pentaerythritol tetrapalmitate; esters between a hexahydric alcohol and an aliphatic carboxylic acid, or esters between a hexabasic carboxylic acid and an aliphatic alcohol, such as dipentaerythritol hexastearate and dipentaerythritol hexapalmitate; esters between a polyhydric alcohol and an aliphatic carboxylic acid, or esters between a polybasic carboxylic acid and an aliphatic alcohol, such as polyglycerol behenate; and natural ester waxes such as carnauba wax and rice wax. A single one or a combination of these may be used.

The content of the plasticizer, expressed per 100.0 mass parts of the binder resin (for example, the resin C), is preferably from 1.0 mass parts to 50.0 mass parts and is more preferably from 5.0 mass parts to 30.0 mass parts.

The abundance $CW_S$ (%) of the ester wax at the depth DA in analysis of the toner particle in the depth direction by time-of-flight secondary ion mass spectrometry is preferably not more than 10. It is more preferably 0 to 5, still more preferably 0 to 3, even more preferably 0 to 1, and is particularly preferably 0.

A $CW_S$ in the indicated range indicates that there is little ester wax at the toner particle surface. By having the $CW_S$ be in the indicated range, the attachment force by the toner to the drum is reduced and the transferability is improved.

The ester wax exhibits a low affinity with the polyester resin. Thus, the $CW_S$ can be reduced by increasing the abundance of the polyester resin at the surface by raising the pH in the heat treatment step and/or by increasing the polyester resin.

Inorganic Fine Particle

Magnetic Body

The toner particle preferably contains an inorganic fine particle. The toner particle more preferably contains a hydrophobically treated inorganic fine particle. The hydrophobically treated inorganic fine particle functions as a charge retention site in the toner particle and the charge retention capability in the toner particle interior is increased further as a consequence.

The inorganic fine particle can be exemplified by the metal oxides of metals such as Fe, Si, Ti, Sn, Zn, Al, and Ce, and known inorganic fine particles can be used. The hydrophobic treatment is accomplished by coating the surface of the inorganic fine particle using an alkyl group-bearing treatment agent.

The inorganic fine particle is preferably material that has undergone a surface treatment with a treatment agent that has an alkyl group having 4 to 20 (preferably 4 to 14 and more preferably 6 to 12) carbon atoms. For example, the inorganic fine particle is preferably an inorganic fine particle in which an alkyl group having 4 to 20 (preferably 4 to 14 and more preferably 6 to 12) carbon atoms is present at the surface of the inorganic fine particle.

There are no particular limitations on the hydrophobic treatment agent as long as it is a treatment agent that contains an alkyl group, and examples of the hydrophobic treatment agent are silane coupling agents, alkyl-modified silicones, and titanium coupling agents. The hydrophobic treatment agent is preferably a silane coupling agent. Silane coupling agents are described below.

The coating treatment is carried out using, per 100 mass parts of the inorganic fine particle, preferably 4 to 20 mass parts and more preferably 5 to 15 mass parts of the treatment agent.

The method for treating the surface of the inorganic fine particle should generally be a treatment method that uses a surface hydrophobic treatment agent, but is not otherwise particularly limited. The following are examples: wet methods, in which the powder to be treated is dispersed in a solvent, e.g., water or an organic solvent, using a mechanochemical mill, e.g., a ball mill or a sand grinder, followed by admixture of the hydrophobic treatment agent and removal of the solvent and drying; dry methods, in which the powder to be treated is mixed with the hydrophobic treatment agent using, e.g., a Henschel mixer or a Super mixer, followed by drying; and methods in which the treatment is carried out by bringing the powder to be treated and the surface hydrophobic treatment agent into contact with each other in a high-velocity gas current, e.g., with a jet mill.

The hydrophobically treated inorganic fine particle is more preferably a magnetic body. When the inorganic fine particle is a magnetic body, the transferability of charge in the toner particle interior is increased further because magnetic bodies have a charge transport capability.

The magnetic body can be exemplified by magnetic iron oxides such as magnetite, maghemite, and ferrite, and magnetic iron oxides that contain another metal oxide, and by metals such as Fe, Co, and Ni, alloys of these metals with a metal such as Al, Co, Cu, Pb, Mg, Ni, Sn, Zn, Sb, Be, Bi, Cd, Ca, Mn, Se, Ti, W, and V, and mixtures of the preceding.

Magnetite is preferred among the preceding, and its shape may be, for example, polyhedral, octahedral, hexahedral, spherical, acicular, flake, and so forth; however, shapes for which the magnetic body-to-magnetic body contact area is small, e.g., hexahedral and spherical shapes, are preferred from the standpoint of increasing the image density through a suppression of aggregability.

The number-average primary particle diameter of the magnetic body is preferably from 50 nm to 500 nm, more preferably from 100 nm to 300 nm, and still more preferably from 150 nm to 250 nm.

The magnetic body content, per 100 mass parts of the binder resin (for example, the resin C), is preferably from 35 mass parts to 100 mass parts and is more preferably from 45 mass parts to 95 mass parts.

The content of the magnetic body in the toner particle can be measured using a TGA Q5000IR thermal analyzer from PerkinElmer Inc. The measurement method is as follows: the toner is heated to 900° C. from normal temperature at a ramp rate of 25° C./minute in a nitrogen atmosphere, and the mass loss at 100° C. to 750° C. is taken to be the mass of the components from the toner excluding the magnetic body and the remaining mass is taken to be the amount of the magnetic body.

The method for producing the magnetic body can be exemplified by the following.

An alkali, e.g., sodium hydroxide, is added—in an equivalent amount or at least an equivalent amount with reference to the iron component—to an aqueous solution of a ferrous salt to prepare an aqueous solution containing ferrous hydroxide. Air is blown in while keeping the pH of the prepared aqueous solution at 7 or above, and an oxidation reaction is carried out on the ferrous hydroxide while heating the aqueous solution to at least 70° C. to first produce seed crystals that will form the magnetic body core.

An aqueous solution containing ferrous sulfate is then added, at 1 equivalent based on the amount of addition of the previously added alkali, to the seed crystal-containing slurry. While maintaining the pH of the liquid at 5 to 10 and blowing in air, the reaction of the ferrous hydroxide is developed in order to grow magnetic iron oxide particles using the seed crystals as cores. At this point, the shape and magnetic properties of the magnetic body can be controlled by free selection of the pH, reaction temperature, and stirring conditions. The pH of the liquid transitions to the acidic side as the oxidation reaction progresses, but the pH of the liquid preferably does not drop below 5. The thusly obtained magnetic iron oxide particles are filtered, washed, and dried by standard methods to obtain the magnetic body.

The hydrophobic treatment of the magnetic body is not particularly limited, but the use is preferred of a hydrophobic treatment agent having a relatively large number of carbon atoms and given by the formula (I) below. In addition, a magnetic body that has been subjected to a surface treatment using the treatment device described below is preferred.

This can result in the appearance of a high hydrophobicity by the uniform reaction of said hydrophobic treatment agent with the magnetic body particle surface.

The magnetic body is preferably a magnetic body that has been hydrophobically treated using the alkyltrialkoxysilane coupling agent represented by the following formula (I) as the hydrophobic treatment agent. That is, the magnetic body is preferably a surface-treated material provided by the hydrophobic treatment agent given by the following formula (I).

$$C_pH_{2p+1}—Si—(OC_qH_{2q+1})_3 \qquad (I)$$

In formula (I), p represents an integer from 4 to 20 (preferably 4 to 14 and more preferably 6 to 12), and q represents an integer from 1 to 3 (preferably 1 or 2).

A satisfactory hydrophobicity can be provided by having p in this formula be at least 4, which is thus preferred. On the other hand, by having p be not more than 20, the magnetic body surface can be uniformly treated and coalescence of the magnetic bodies can be suppressed, and this is thus preferred. Examples are n-butyltrimethoxysilane, isobutyltrimethoxysilane, n-hexyltrimethoxysilane, n-octyltrimethoxysilane, and n-decyltrimethoxysilane.

The SP value of the hydrophobic treatment agent, for the state in which the hydrophobic treatment agent is bonded to the magnetic body, is preferably from 8.00 to 9.00, more preferably from 8.20 to 8.90, and still more preferably from 8.40 to 8.80. For the case in which the hydrophobic treatment agent is an alkyltrialkoxysilane coupling agent, the state of bonding with the magnetic body surface is hypothesized to be a state in which one of the functional groups forms a bond with the magnetic body surface and the remaining two functional groups are condensed with functional groups present in other molecules of the hydrophobic treatment agent. Even when the number of functional groups is different, a state is hypothesized in which one functional group similarly forms a bond with the magnetic body surface. The unit of the SP value is $(cal/cm^3)^{0.5}$.

The difference between the SP value of the plasticizer and the SP value of the hydrophobic treatment agent for the state in which it is bonded with the magnetic body is preferably not more than 0.30, more preferably not more than 0.25, and still more preferably not more than 0.20. Plasticization in the vicinity of the magnetic body during the fixing process is facilitated when the difference between the SP value of the plasticizer and the SP value of the hydrophobic treatment agent for the state in which it is bonded with the magnetic body is in the indicated range. Due to this, the mobility of the magnetic body during the fixing process is improved, which results in a more uniform dispersion of the magnetic body in the image. The image density is further improved as a consequence.

The hydrophobic treatment method is not particularly limited, but the following method is preferred.

The hydrophobic treatment is preferably carried out by a dry method using a wheel kneader or a mortar—with the objective of causing the expression of a high hydrophobicity by uniformly reacting the hydrophobic treatment agent with the magnetic body particle surface, while at the same time not causing a complete hydrophobing of the hydroxyl groups on the magnetic body particle surface in order to leave a portion thereof extant.

For example, a Mix Muller, Multimul, Stotz mill, back-flow kneader, and Eirich mill can be used as this wheel kneader, and the use of a Mix Muller is preferred.

Three actions, i.e., a compressive action, a shearing action, and a spatulation action, can be expressed when a wheel kneader or mortar is used.

The hydrophobic treatment agent present between magnetic body particles is pressed into the magnetic body surface through the compressive action and the adhesiveness and reactivity with the particle surface can then be increased. Shear force is applied to both the hydrophobic treatment agent and magnetic body through the shearing action and the hydrophobic treatment agent can then be smeared out and the magnetic body particles can be dispersed and disaggregated. Moreover, through the spatulation action, the hydrophobic treatment agent present on the magnetic body particle surface can be uniformly spread out as if spread with a spatula.

Through the continuous and repeated application of these three actions, the magnetic body particles are disaggregated and reaggregation is prevented, and the surface of individual particles can be hydrophobically treated without bias while disaggregating into individual particles.

With a hydrophobic treatment agent given by formula (I) that has a relatively large number of carbon atoms, a tendency generally appears whereby uniform treatment at the molecular level at the magnetic body particle surface is impeded because the molecule is large and bulky; however, a consistent treatment can be carried out when treatment is performed by the aforementioned procedure, which is thus preferred.

Colorant

In addition to the magnetic body particle described in the preceding, the toner particle may further contain a colorant. The known magnetic bodies and pigments and dyes in the individual colors of black, yellow, magenta, and cyan as well as in other colors may be used without particular limitation as this colorant.

The black colorant can be exemplified by black pigments such as carbon black.

The yellow colorant can be exemplified by yellow pigments and yellow dyes, e.g., monoazo compounds, disazo compounds, condensed azo compounds, isoindolinone compounds, benzimidazolone compounds, anthraquinone compounds, azo metal complexes, methine compounds, and allylamide compounds.

Specific examples are C. I. Pigment Yellow 74, 93, 95, 109, 111, 128, 155, 174, 180, and 185 and C. I. Solvent Yellow 162.

The magenta colorants can be exemplified by magenta pigments and magenta dyes, e.g., monoazo compounds, condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Specific examples are C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, and 269, and C. I. Pigment Violet 19.

The cyan colorants can be exemplified by cyan pigments and cyan dyes, e.g., copper phthalocyanine compounds and derivatives thereof, anthraquinone compounds, and basic dye lake compounds.

Specific examples are C. I. Pigment Blue 1, 7, 15, 15:1, 15:2, 15:3, 15:4, 60, 62, and 66.

The content of the colorant is preferably from 1.0 mass parts to 20.0 mass parts per 100.0 mass parts of the binder resin (for example, the resin C).

Release Agent

Besides the previously described plasticizer, the toner particle may contain a known wax as a release agent.

Specific examples are petroleum waxes as represented by paraffin waxes, microcrystalline waxes, and petrolatum, and derivatives thereof; montan wax and derivatives thereof; hydrocarbon waxes provided by the Fischer-Tropsch method, and derivatives thereof; polyolefin waxes as represented by polyethylene, and derivatives thereof; and natural waxes as represented by carnauba wax and candelilla wax, and derivatives thereof. The derivatives include oxides and block copolymers and graft modifications with vinyl monomers. Other examples are alcohols such as higher aliphatic alcohols; fatty acids such as stearic acid and palmitic acid, and their acid amides, esters, and ketones; hardened castor oil and derivatives thereof; plant waxes; and animal waxes. A single one of these or a combination thereof may be used.

Among the preceding, a trend of an enhanced developing performance and transferability is exhibited when a polyolefin, a hydrocarbon wax provided by the Fischer-Tropsch method, or a petroleum wax is used, which is thus preferred. An oxidation inhibitor may be added to these waxes in a range that does not influence the effects for the toner according to the present invention.

The content of these waxes is preferably from 1.0 mass parts to 30.0 mass parts per 100.0 mass parts of the binder resin (for example, the resin C).

The melting point of the wax is preferably from 30° C. to 120° C. and is more preferably from 60° C. to 100° C.

The use of a wax exhibiting such a thermal behavior results in an efficient expression of the release effect and the provision of a broader fixing window.

Charge Control Agent

The toner particle may contain a charge control agent in addition to the resin A that has been described in the preceding. A known charge control agent may be used without particular limitation as this charge control agent.

The negative-charging charge control agents can be exemplified by the following: metal compounds of aromatic carboxylic acids such as salicylic acid, alkylsalicylic acids, dialkylsalicylic acids, naphthoic acid, and dicarboxylic acids, and polymers and copolymers that have said metal compound of an aromatic carboxylic acid; polymers and copolymers that have a sulfonic acid group, sulfonate salt group, or sulfonate ester group, other than the resin A; metal salts and metal complexes of azo dyes and azo pigments; boron compounds; silicon compounds; and calixarene.

The positive-charging charge control agents, on the other hand, can be exemplified by quaternary ammonium salts and polymeric compounds that have a quaternary ammonium salt in side chain position; guanidine compounds; nigrosine compounds; and imidazole compounds.

The content of the charge control agent is preferably from 0.01 mass parts to 5.0 mass parts per 100.0 mass parts of the binder resin (for example, the resin C).

External Additives

The toner may contain an external additive.

Known external additives may be used without particular limitation as this external additive.

Specific examples are as follows: base silica fine particles, e.g., silica produced by a wet method or silica produced by a dry method; surface-treated silica fine particles provided by subjecting such base silica fine particles to a surface treatment with a treatment agent such as a silane coupling agent, titanium coupling agent, silicone oil, and so forth; strontium titanate fine particles; and resin fine particles such as vinylidene fluoride fine particles, polytetrafluoroethylene fine particles, and so forth.

An organic/inorganic composite fine particle may also be used. This organic/inorganic composite fine particle preferably has a structure in which a resin particle functions as a base particle and an inorganic fine particle, such as a silica fine particle, is present on the surface of this base particle. In addition, more preferably at least a portion of the inorganic fine particle is embedded in the resin particle.

The resin particle can be exemplified by polymers of (meth)acrylic group-bearing alkoxysilane compounds such as 3-methacryloxypropyltrimethoxysilane, 3-methacryloxypropylmethyldimethoxysilane, and 3-methacryloxypropyltriethoxysilane.

The method described in WO 2013/063291 is an example of a method for forming a composite using a resin particle and a silica fine particle. An example is a method in which the aforementioned alkoxysilane compound is mixed into a dispersion of the silica fine particles and the alkoxysilane compound is then polymerized in the presence of the silica fine particles.

The content of the inorganic fine particle in the organic/inorganic composite fine particle is preferably from 40 mass % to 80 mass %, more preferably from 50 mass % to 75 mass %, and still more preferably from 55 mass % to 70 mass %.

The number-average primary particle diameter of the inorganic fine particle in the organic/inorganic composite fine particle is preferably 5 nm to 60 nm and more preferably 10 nm to 30 nm.

The organic/inorganic composite fine particle may be subjected to a surface treatment by, e.g., a hydrophobic treatment, a silicone oil treatment, and so forth.

The hydrophobing method operates by a chemical treatment with an organosilicon compound that reacts with or physically adsorbs to silica. In a preferred method, silica produced by the vapor-phase oxidation of a silicon halide compound is treated with an organosilicon compound.

The content of the external additive is preferably from 0.1 mass parts to 5.0 mass parts per 100.0 mass parts of the toner particle.

The external additive preferably contains a silica fine particle, a strontium titanate fine particle, and an organic/inorganic composite fine particle.

The external addition treatment with the external additive may be carried out using a known mixer, e.g., a Henschel mixer. In the case of use of a plurality of external additives, mixing/treatment of the toner particle with the organic/inorganic composite fine particle may be carried out in a first-stage mixing operation and mixing with the silica fine particle and the strontium titanate fine particle may be carried out in a second-stage mixing operation.

Methods for obtaining the toner are described in detail in the following.

Toner Particle Production

The method for producing the toner particle is not particularly limited, and, for example, a suspension polymerization method, dissolution suspension method, emulsion aggregation method, pulverization method, and so forth can be used. Among these, suspension polymerization and dissolution suspension methods are preferred because they facilitate control of the state of occurrence of the resin A and the resin B in the toner particle into advantageous ranges.

The toner particle production method preferably has a heat treatment step of subjecting a toner particle precursor comprising the resin A and the resin B to treatment for at least 10 minutes in an aqueous medium at a pH in the range from 7.5 to 10.0 at a temperature of 95° C. to 120° C. This heat treatment step functions to facilitate movement of the resin B out to the toner particle surface and to facilitate obtaining the effects of the present invention as a result. The heat treatment step can be supplied with an aqueous medium that contains a toner particle precursor that has itself been obtained via a polymerization step and a distillation step carried out thereafter on an optional basis.

The temperature in this heat treatment step is more preferably 97° C. to 115° C. and still more preferably 97° C. to 100° C. The pH in the heat treatment step is more preferably 7.8 to 9.5 and still more preferably 7.8 to 8.5. The duration of the heat treatment step is more preferably at least 20 minutes, still more preferably 20 to 120 minutes, and even more preferably 30 to 60 minutes.

The toner particle precursor preferably contains an inorganic fine particle, e.g., the magnetic body described in the preceding.

A method for obtaining the toner particle (toner particle precursor) by suspension polymerization is described in the following by way of example.

First, the polymerizable monomer that will produce the binder resin (for example, the resin C) is mixed with the resin A and the resin B and any optional additives, e.g., the inorganic fine particle (magnetic body), and, using a disperser, a polymerizable monomer composition is prepared in which these materials are dissolved or dispersed.

The additives can be exemplified by colorants, release agents, plasticizers, charge control agents, polymerization initiators, chain transfer agents, and so forth.

The disperser can be exemplified by homogenizers, ball mills, colloid mills, and ultrasound dispersers.

The polymerizable monomer composition is then introduced into an aqueous medium that optionally contains a dispersion aid, e.g., a sparingly water-soluble inorganic dispersion stabilizer, and droplets of the polymerizable monomer composition are prepared using a high-speed disperser such as a high-speed stirrer or an ultrasound disperser (granulation step).

The toner particle precursor is then obtained by polymerizing the polymerizable monomer in the droplets (polymerization step).

The polymerization initiator may be admixed during the preparation of the polymerizable monomer composition or may be admixed into the polymerizable monomer composition immediately prior to droplet formation in the aqueous medium.

In addition, it may also be added, optionally dissolved in the polymerizable monomer or another solvent, during granulation into droplets or after the completion of granulation, i.e., immediately before the initiation of the polymerization reaction.

After the binder resin has been obtained by the polymerization of the polymerizable monomer, a distillation step may be carried out on an optional basis and the residual polymerizable monomer may be removed to obtain a dispersion of the toner particle precursor.

The aforementioned heat treatment step is preferably carried out following the polymerization step and the distillation step.

A crystallization control step is preferably carried out after the heat treatment step. This crystallization control step comprises a step of holding the dispersion after the heat treatment step at a temperature at which crystallization of the crystalline material is readily promoted, preferably at about 40° C. to 65° C. (more preferably 50° C. to 60° C.). The duration of holding is, for example, 0.5 to 5 hours (preferably 1 to 3 hours).

This is followed as necessary by filtration, washing, drying, classification, and so forth using known methods to obtain the toner particle.

Known monomers may be used without particular limitation as the polymerizable monomer when the binder resin is obtained by, for example, an emulsion aggregation method or a suspension polymerization method. Specific examples here are the vinyl monomers provided in the section on the binder resin.

A known polymerization initiator may be used without particular limitation as the polymerization initiator. Specific examples are as follows:

peroxide-type polymerization initiators, for which typical examples are hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenylacetic acid-tert-hydroperoxide, tert-butyl performate, tert-butyl peracetate, tert-butyl perbenzoate, tert-butyl perphenylacetate, tert-butyl permethoxyacetate, per-N-(3-tolyl) palmitate-tert-butylbenzoyl peroxide, t-butyl peroxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide, lauroyl peroxide, and so forth; and azo and diazo polymerization initiators, for which typical examples are 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and so forth.

A dispersion aid may be used in the aqueous medium.

For example, a known dispersion stabilizer or surfactant can be used as the dispersion aid.

The dispersion stabilizer can be specifically exemplified by the following: inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina, and organic dispersion stabilizers such as polyvinyl alcohol, gelatin, methyl cellulose, methyl hydroxypropyl cellulose, ethyl cellulose, sodium carboxymethyl cellulose, and starch.

The surfactant can be exemplified by anionic surfactants, e.g., alkyl sulfate ester salts, alkylbenzenesulfonate salts, and fatty acid salts; nonionic surfactants such as polyoxyethylene alkyl ethers and polyoxypropylene alkyl ethers; and cationic surfactants such as alkylamine salts and quaternary ammonium salts.

Among the preceding, the presence of an inorganic dispersion stabilizer is preferred, and the presence of a dispersion stabilizer comprising a phosphate salt, e.g., tricalcium phosphate, hydroxyapatite, magnesium phosphate, zinc phosphate, aluminum phosphate, and so forth, is more preferred.

The methods used to measure, e.g., the various properties, are more particularly described in the following.

Method for Measuring Amount of Ion (Secondary Ion Mass/Secondary Ion Charge Number (m/z)) by Time-Of-Flight Secondary Ion Mass Spectrometry (TOF-SIMS) (Measurement of $CA_S$, $CB_S$, $CA_{75}$, $CB_{75}$, and $CW_S$)

A nanoTOFII from Ulvac-Phi Incorporated is used to measure the amount of ion (peak intensity) using TOF-SIMS.

The analytic conditions are as follows:

sample preparation: the toner particle separated from the toner by the method described below is adhered to an indium sheet.
sample pretreatment: none
primary ion: $Bi_3^{++}$ ion
acceleration voltage: 30 kV
charge neutralization mode: On
measurement mode: Negative
raster: 300×300 $\mu m^2$
mass range: m/z 0.5 to 1850
measurement time: 30 s TOF-SIMS is generally a surface analysis procedure, and the data in the depth direction are approximately data for 1 nm. Due to this, measurement of the intensities in the toner particle interior is carried out by milling the surface by sputtering the toner with argon gas cluster ions.

The sputtering conditions are as follows.

acceleration voltage: 5 kV
current: 4.9 nA
raster: 800×800 $\mu m^2$
exposure time: 4 s For the depth measurement, the relationship with the exposure time was checked by sputtering a PMMA film using the same conditions as above, and a 75-nm milling in 120 s was confirmed.

For the toner according to the present disclosure, the intensities at 75 nm from the toner particle surface were taken to be the values of the amounts of ion measured when 30 rounds of sputtering were carried out using the conditions indicated above.

Characteristic peaks are selected for each material from the spectra obtained by measurement of standard materials for the resin A, the resin B, and the ester wax, and the abundance is calculated for each depth for each material by comparing, at each depth, the peak intensity with the peak intensity of the standard material.

The following assignments are made: DA (nm) is assigned to the depth, between a depth of 0 nm (toner particle surface) to 10 nm, at which the abundance of the resin A assumes a maximum; $CA_S$ (%) is assigned to the abundance of the resin A at the depth DA; $CB_S$ (%) is assigned to the abundance of the resin B at the depth DA; and $CW_S$ (%) is assigned to the abundance of the ester wax at the depth DA. In addition, $CA_{75}$ (%) is assigned to the abundance of the resin A at a depth of 75 nm and $CB_{75}$ (%) is assigned to the abundance of the resin B at a depth of 75 nm.

Specifically, the abundance (%) is taken to be the ratio of the peak intensity for a particular material in the toner when 100 is used for the peak intensity in measurement of the standard material. The average of the ratios for each peak intensity is adopted when a plurality of peaks are selected. With regard to the standard materials, the acquired standard material is used when the particular material can be acquired. When acquisition is problematic, the resin A and the resin B separated from the toner by the procedure described below may be used for the standard material.

The characteristic peaks for the individual materials are selected as follows.

resin A: Peaks characteristic of the sulfonic acid-type group are selected. For the case of the resin A-1 in the examples, peaks at m/z=80 (corresponds to $SO_3^-$) and 206 (corresponds to the monomer unit) are selected.

resin B: Peaks originating with the dicarboxylic acid or diol in the polyester resin are selected. For the case of the resin B-1 in the examples, peaks at m/z=76, 120, and 121 (corresponds to the terephthalic acid segment) and 211 (corresponds to the bisphenol A segment) are selected.

ester wax: Peaks originating with the carboxylic acid or alcohol constituting the ester are selected. For the case of behenyl stearate, peaks at m/z=265 and 285 (corresponds to the stearic acid segment) and 592 (corresponds to behenyl stearate) are selected.

Separation of Resin A, Resin B, and Resin C from Toner

The sample is the chloroform-soluble matter from the toner particle. The sample submitted to measurement is provided by adjusting the toner particle concentration in chloroform to 0.1 mass % and filtering the resulting solution with a 0.45-μm PTFE filter. The measurement conditions for the gradient polymer LC are given below.

instrument: ULTIMATE 3000 (Thermo Fisher Scientific Inc.)
mobile phases: A chloroform (HPLC), B acetonitrile (HPLC)
gradient: 2 min (A/B=0/100)→25 min (A/B=100/0)
(A linear gradient was used for the change in the mobile phase.)
flow rate: 1.0 mL/minute
injection: 0.1 mass %×20 μL
column: Tosoh TSKgel ODS (4.6 mmø×150 mm×5 μm)
column temperature: 40° C.
detector: Corona charged particle detector (Corona-CAD) (Thermo Fisher Scientific Inc.)

Components with a higher solubility in acetonitrile elute with a faster timing in this measurement, and as a consequence resin A elutes fastest followed by the resin B and the resin C in the indicated sequence. By confirming peaks corresponding to each of these resins and carrying out fractionation using this timing, fractions containing the resin A, the resin B, and the resin C can be recovered. Drying and concentration provides a sample of the resin A component, a sample of the resin B component, and a sample of the resin C component.

Analysis of Structure (Individual Monomer Units) of Resin A, Resin B, and Resin C Separated from Toner The compositional ratios and mass ratios are measured using nuclear magnetic resonance spectroscopy (NMR) as follows using the sample of the resin A component, the sample of the resin B component, and the sample of the resin C component.

1 mL of deuterochloroform is added to 20 mg of the sample of the resin A component or the sample of the resin B component and the proton-NMR spectrum of the dissolved resin is measured. The molar ratio and mass ratio of each monomer can be calculated from the resulting NMR spectrum and the content of each monomer unit can be determined. For example, in the case of a styrene-acrylic copolymer, the compositional ratio and mass ratio can be calculated based on the peak in the vicinity of 6.5 ppm that originates from the styrene monomer and based on the peak in the vicinity of 3.5 to 4.0 ppm that originates from the acrylic monomer.

The concentration of sulfonic acid-type groups in the resin A and the ester group concentration in the resin B are determined by calculation from the obtained monomer unit proportions.

The following instrumentation and measurement conditions can be used for the nuclear magnetic resonance spectroscopy (NMR).

NMR instrument: RESONANCE ECX500, JEOL Ltd.

measurement nucleus: proton measurement mode: single pulse

Measurement of Sulfonic Acid-Type Group Concentration in Resin A

This is specifically calculated as follows.

The monomer unit ratios are calculated using the method described above, and the sulfonic acid-type group concentration is calculated based on the following formula from the ratio $R_S$ (mass %) and mass number $W_S$ (g/mol) of the sulfonic acid-type group-containing monomer unit.

sulfonic acid-type group concentration (mmol/g)=$(R_S/100)\times 1000/W_S$

Measurement of Ester Group Concentration in Resin B

This is specifically calculated as follows.

The monomer unit ratios are calculated using the method described above, and the ester group concentration is calculated based on the following formula from the mass number $W_{AL}$ (g/mol) and number of functional groups $N_{AL}$ (the arithmetic average is used for the mass number and number of functional groups when a plurality of species are used) of the alcohol monomer and the mass number $W_{AC}$ (g/mol) and number of functional groups $N_{AC}$ (the arithmetic average is used for the mass number and number of functional groups when a plurality of species are used) of the acid monomer.

$$\text{ester group concentration (mmol/g)} = 1000\times((N_{AL}+N_{AC})/2)/(W_{AL}+W_{AC})$$

Measurement of Wax Molecular Weight by Mass Spectrometry

Separation of the Wax from the Toner

Measurement can be carried out on the toner as such, but the execution of a separation procedure is more preferred.

The toner is dispersed in ethanol, which is a poor solvent for the toner, and the temperature is raised to a temperature above the melting point of the wax. Pressure may be applied at this time as necessary. The wax, brought to above its melting point by this procedure, is melted and extracted into the ethanol. When pressure is applied in addition to the heating, the wax can be separated from the toner by performing solid-liquid separation under the pressure. The wax is then obtained by drying and solidifying the extract.

Identification of the Wax and Measurement of the Molecular Weight of the Wax by Pyrolysis GCMS mass analysis instrument: ISQ, Thermo Fisher Scientific Inc.

GC instrument: Focus GC, Thermo Fisher Scientific Inc.

ion source temperature: 250° C.

ionization method: EI mass range: 50 to 1000 m/z column: HP-5MS [30 m]

pyrolysis instrument: JPS-700, Japan Analytical Industry Co., Ltd.

A small amount of the wax separated by the extraction procedure and 1 μL of tetramethylammonium hydroxide (TMAH) are added to 590° C. pyrofoil. Pyrolysis GCMS measurement is carried out on the prepared sample using the conditions described above to obtain respective peaks for the alcohol component and carboxylic acid component deriving from the ester compound. Due to the action of the TMAH methylating agent, the alcohol component and carboxylic acid component are detected as the methylation products. The structure of the wax can be identified by analysis of the resulting peaks.

Separation of Toner Particles from Toner

Separation of toner particles from the toner is carried out using the following procedure. The resulting toner particles can be used in the respective measurement methods.

Case of Nonmagnetic Toner

A sucrose concentrate is prepared by the addition of 160 g of sucrose (Kishida Chemical Co., Ltd.) to 100 mL of deionized water and dissolving while heating on a water bath. 31 g of this sucrose concentrate and 6 mL of Contaminon N (a 10 mass % aqueous solution of a neutral pH 7 detergent for cleaning precision measurement instrumentation, comprising a nonionic surfactant, anionic surfactant, and organic builder, Wako Pure Chemical Industries, Ltd.) are introduced into a centrifugal separation tube to prepare a dispersion. 1 g of the toner is added to this dispersion, and clumps of the toner are broken up using, for example, a spatula.

The centrifugal separation tube is set into a "KM Shaker" (model: V. SX) from Iwaki Sangyo Co., Ltd., and shaking is carried out for 20 minutes using the condition of 350 excursions per 1 minute. After the shaking, the solution is transferred over to a glass tube (50 mL) for swing rotor service and centrifugal separation is carried using a centrifugal separator and conditions of 30 minutes and 3,500 rpm.

After the centrifugal separation, the toner particles are present in the uppermost layer in the glass tube, and external additives, e.g., silica fine particles, are present on the aqueous solution side of the lower layer. The toner particles in the upper layer are recovered and filtered and are subjected to a throughflow water wash with 2 L of deionized water heated to 40° C. and the washed toner particles are recovered.

Case of Magnetic Toner

A dispersion medium is prepared by introducing 6 mL of Contaminon N (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) into 100 mL of deionized water. 5 g of the toner is added to this dispersion medium and dispersion is carried out for 5 minutes using an ultrasound disperser (VS-150, As One Corporation). This is followed by placement in a "KM Shaker" (model: V. SX) from Iwaki Sangyo Co., Ltd., and shaking is performed for 20 minutes at 350 excursions per 1 minute.

The toner particles are then retained using a neodymium magnet. The retained toner particles are collected. These toner particles are subjected to a throughflow water wash with 2 L of deionized water heated to 40° C. and the washed toner particles are recovered.

Separation of Inorganic Fine Particles Present in Toner Particle and Analysis of Structure of Treatment Agent 10 mL of chloroform is added to 100 mg of the toner particle separated from the toner using the method described above and the binder resin is dissolved by processing for 10 minutes with a homogenizer. This is followed by recovery of the inorganic fine particles by centrifugal separation. The inorganic fine particles are separated by repeating this procedure a plurality of times.

The obtained magnetic body is submitted to pyrolysis GCMS using the conditions indicated below. A pyrolyzate of the surface treatment agent is obtained as the result of the measurement, and as a consequence the number of carbon atoms in the surface treatment agent is determined from the main component. The pyrolyzate is detected as, for example, the alkyl substituent group of the surface treatment agent, or its double-bond modification or alkylsilane.

mass analysis instrument: ISQ, Thermo Fisher Scientific Inc.
GC instrument: Focus GC, Thermo Fisher Scientific Inc.
ion source temperature: 250° C.
ionization method: EI
mass range: 50 to 1000 m/z
column: HP-5MS [30 m]
pyrolysis instrument: JPS-700, Japan Analytical Industry Co., Ltd.

Measurement of Number-Average Primary Particle Diameter of Magnetic Body

Measurement of the particle diameter of the magnetic body is carried out using an "S-4800" scanning electron microscope (trade name, from Hitachi, Ltd.). The separated magnetic body is observed, and the particle diameter is determined by measuring the long diameter of the primary particles of the magnetic body in a visual field magnified by a maximum of 200,000×. The observation magnification is adjusted as appropriate depending on the size of the magnetic body.

Verification that Resin A, Resin B, and Resin C Separated from Toner are Amorphous Resins Whether the resin A, the resin B, the resin C, and so forth are amorphous resins is confirmed by the presence/absence of a clear endothermic peak using the following method.

The endothermic peak measured using differential scanning calorimetric measurement (DSC) is measured in accordance with ASTM D 3418-82 using a "Q2000" differential scanning calorimeter (TA Instruments). Temperature correction in the instrument detection section is performed using the melting points of indium and zinc, and the amount of heat is corrected using the heat of fusion of indium. Specifically, 3 mg of the sample is exactly weighed out and introduced into an aluminum pan, and the measurement is run using the following conditions and using an empty aluminum pan for reference.

ramp rate: 10° C./min
measurement start temperature: 30° C.
measurement end temperature: 180° C.

The measurement is carried out at a ramp rate of 10° C./min in the measurement range of 30° C. to 180° C. The temperature is raised to 180° C. and held for 10 minutes and is then reduced to 30° C. and subsequently raised again. An endothermic peak is checked for the sample from the temperature-endothermic quantity curve in the temperature range of 30° C. to 180° C. in this second temperature ramp up step.

Calculation of SP Values

The SP values are determined proceeding as follows using the calculation method proposed by Fedors.

The energy of vaporization (Δei) (cal/mol) and the molar volume (Δvi) ($cm^3$/mol) are determined from the tables given in "Polym. Eng. Sci., 14(2), 147-154 (1974)" for the atoms or atomic groups in each molecular structure.

Specifically, the energy of vaporization (Δei) and the molar volume (Δvi) of the alkyl group are each determined; the determination is carried out by dividing the energy of vaporization by the molar volume and calculation is performed using the following formula.

$$SP\text{ value} = \left\{\left(\sum_j \times \sum \Delta ei\right) / \left(\sum j \times \sum \Delta vi\right)\right\}^{0.5}$$

Method for Measuring Weight-Average Particle Diameter (D4) and Number-Average Particle Diameter (D1)

The weight-average particle diameter (D4) and the number-average particle diameter (D1) of the toner, toner particle, or toner base particle (also referred to below as, for example, toner) is determined proceeding as follows.

The measurement instrument used is a "Coulter Counter Multisizer 3" (registered trademark, Beckman Coulter, Inc.), a precision particle size distribution measurement instrument operating on the pore electrical resistance method and equipped with a 100-μm aperture tube.

The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of 1.0% and, for example, "ISOTON II" (Beckman Coulter, Inc.) can be used.

The dedicated software is configured as follows prior to measurement and analysis.

In the "modify the standard operating method (SOMME)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the "threshold value/noise level measurement button". In addition, the current is set to 1,600 μA; the gain is set to 2; the electrolyte solution is set to ISOTON II; and a check is entered for the "post-measurement aperture tube flush".

In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm.

The specific measurement method is as follows.

(1) 200.0 mL of the aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30.0 mL of the aqueous electrolyte solution is introduced into a 100-mL flatbottom glass beaker. To this is added as dispersing agent 0.3 mL of a dilution prepared by the three-fold (mass) dilution with deionized water of "Contaminon N" (a 10% aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. 3.3 L of deionized water is introduced into the water tank of the ultrasound disperser and 2.0 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the, e.g., toner, is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the aqueous electrolyte solution prepared in (5) and containing, e.g., dispersed toner, is dripped into the roundbottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) and the number-average particle diameter (D1) are calculated. When set to graph/volume % with the dedicated software, the "average diameter" on the "analysis/volumetric statistical value (arithmetic average)" screen is the weight-average particle diameter (D4). When set to graph/number % with the dedicated software, the "average diameter" on the "analysis/numerical statistical value (arithmetic average)" screen is the number-average particle diameter (D1).

Method for Measuring Molecular Weight

The molecular weight of the resins, e.g., the polyester resin, is measured using gel permeation chromatography (GPC) as follows. First, the polyester resin is dissolved in tetrahydrofuran (THF) at room temperature. The obtained solution is filtered using a "Sample Pretreatment Cartridge" (Tosoh Corporation) solvent-resistant membrane filter having a pore diameter of 0.2 μm to obtain a sample solution. The sample solution is adjusted to a concentration of THF-soluble component of 0.8 mass %. Measurement is carried out under the following conditions using this sample solution. instrument: "HLC-8220GPC" high-performance GPC instrument [Tosoh Corporation]

column: 2×LF-604
eluent: THF
flow rate: 0.6 mL/min
oven temperature: 40° C.
sample injection amount: 0.020 mL A molecular weight calibration curve constructed using polystyrene resin standards (for example, product name "TSK Standard Polystyrene F-850, F-450, F-288, F-128, F-80, F-40, F-20, F-10, F-4, F-2, F-1, A-5000, A-2500, A-1000, A-500", Tosoh Corporation) is used to determine the molecular weight of the sample.

Measurement of Glass Transition Temperature (Tg)

The glass transition temperature (Tg) is measured using a "Q2000" differential scanning calorimeter (TA Instruments) in accordance with ASTM D 3418-82.

Measurement of Acid Value of Resins

The acid value is the number of milligrams of potassium hydroxide required to neutralize the acid present in 1 g of a sample. The acid value of the binder resin is measured in accordance with JIS K 0070-1992.

EXAMPLES

The present invention is more specifically described in the examples provided below. However, these in no way limit the present invention. Unless specifically indicated otherwise, the "parts" and "%" in the formulations in the examples and comparative examples are on a mass basis in all instances.

Production Example for Sulfonic Acid-Type Group Containing Vinyl Resin 1 (Resin A-1)

styrene 85.0 parts
n-butyl acrylate (n-BA) 11.0 parts
2-acrylamido-2-methylpropanesulfonic acid (AMPS) 4.0 parts These materials were dissolved in 60.0 parts of dimethylformamide, stirring was carried out for 1.0 hour while bubbling with nitrogen, and heating to 110° C. was carried out. Into this reaction solution was added dropwise a mixture of 3.0 parts tert-butyl peroxyisopropyl monocarbonate (tradename: Perbutyl I®, NOF Corporation) as initiator and 37.0 parts of toluene. A reaction was run for 4.0 hours at 110° C. This was followed by cooling and dropwise addition to 1000.0 parts of methanol to obtain a precipitate. The resulting precipitate was dissolved in 120.0 parts of tetrahydrofuran, followed by dropwise addition to 1800 parts of methanol to bring about the precipitation of a white precipitate. Filtration and drying under reduced pressure at a temperature of 90° C. yielded a sulfonic acid-type group-containing vinyl resin 1.

Production Example for Sulfonic Acid-Type Group-Containing Vinyl Resins 2 to 4 (Resins A-2 to A-4)

Sulfonic acid-type group-containing vinyl resins 2 to 4 (resins A-2 to A-4) were obtained proceeding as in the Production Example for Sulfonic Acid-Type Group-Containing Vinyl Resin 1, but changing the starting materials used to the materials indicated in the following Table 1.

Ethyl p-styrenesulfonate was used as the sulfonate ester.

TABLE 1

| Sulfonic acid-type group-containing vinyl resin (resin A) No. | Styrene | n-BA | AMPS | Sulfonate ester | Sulfonic acid-type group concentration mmol/g |
|---|---|---|---|---|---|
| A-1 | 86.0 | 11.0 | 4.0 | | 0.19 |
| A-2 | 85.0 | 11.0 | | 4.0 | 0.19 |
| A-3 | 79.0 | 11.0 | 10.0 | | 0.48 |
| A-4 | 87.5 | 11.0 | 1.5 | | 0.07 |

The numerical values for each of the monomers in the table indicate the number of parts. The unit for the sulfonic acid-type group concentration is mmol/g. Production Example for Polyester Resin 1 (Resin B-1)

45 mol % terephthalic acid (TPA), 5 mol % trimellitic acid (TMA), 45 mol % bisphenol A 2 mol propylene oxide adduct (BisA-PO 2 mol adduct), and 5 mol % ethylene glycol (EG) were introduced into a reactor fitted with a nitrogen introduction line, water separation tube, stirrer, and thermocouple, followed by the addition, as catalyst, of 1.5 parts of dibutyltin per 100 parts of the total amount of monomer.

Then, after rapidly heating to 180° C. at normal pressure under a nitrogen atmosphere, a polycondensation was run while distilling off the water while heating from 180° C. to 210° C. at a rate of 10° C./hour. After 210° C. had been reached, the pressure in the reactor was reduced to 5 kPa or below and a polycondensation was run at 210° C. at a pressure condition of 5 kPa or below to obtain polyester resin 1. Polyester resin 1 had a weight-average molecular weight (Mw) of 12,000, a glass transition temperature (Tg) of 70° C., and an acid value of 6.7 mg KOH/g.

Production Example for Polyester Resins 2 to 6 (Resins B-2 to B-6)

Polyester resins 2 to 6 (resins B-2 to B-6) were obtained proceeding as in the Production Example for Polyester Resin 1, but changing the starting materials used to the materials indicated in the following Table 2.

TABLE 2

| Polyester resin (resin B) No. | TPA | TMA | BisA-PO2mol adduct | EG | Ester group concentration mmol/g | Acid value mgKOH/g |
|---|---|---|---|---|---|---|
| B-1 | 45 | 5 | 45 | 5 | 4.2 | 6.7 |
| B-2 | 40 | 10 | 45 | 5 | 4.3 | 13.5 |
| B-3 | 48 | 2 | 45 | 5 | 4.2 | 3.9 |
| B-4 | 45 | 5 | 0 | 50 | 8.8 | 6.7 |
| B-5 | 45 | 5 | 50 | 0 | 4 | 6.7 |
| B-6 | 35 | 15 | 45 | 5 | 4.3 | 20.1 |

The numerical values for each of the monomers in the table indicate mol %.

Magnetic Body Fine Particle 1 Production Example 1.0 equivalent, with reference to the iron ion, of a sodium hydroxide solution (contained sodium hexametaphosphate at 1 mass % as P with reference to Fe) was mixed into an aqueous ferrous sulfate solution to prepare an aqueous solution that contained ferrous hydroxide. While maintaining the aqueous solution at pH 9, air was bubbled in and an oxidation reaction was run at 80° C. to prepare a slurry in which seed crystals were produced.

An aqueous ferrous sulfate solution was then added to the slurry so as to provide 1.0 equivalents with reference to the initial amount of alkali (sodium component in the sodium hydroxide). The slurry was held at pH 8 and an oxidation reaction was run while bubbling in air; the pH was adjusted to 6 at the end of the oxidation reaction; and washing with water and drying yielded a magnetic iron oxide, which was a spherical magnetite particle and had a number-average primary particle diameter of 200 nm.

10.0 kg of the magnetic iron oxide was introduced into a Simpson Mix Muller (Model MSG-0L, SINTOKOGIO Co., Ltd.) and milling was performed for 30 minutes.

This was followed by the addition to this same device of 95 g of n-decyltrimethoxysilane as a silane coupling agent and operation for 1 hour to hydrophobically treat the particle surface of the magnetic iron oxide with the indicated silane coupling agent, thus yielding magnetic body fine particle 1. The properties of magnetic body fine particle 1 are given in Table 3.

Magnetic Body Fine Particles 2 to 4 Production Example

Magnetic body fine particles 2 to 4 were obtained proceeding as in the Magnetic Body Fine Particle 1 Production Example, but changing the starting materials used to the materials indicated in Table 3.

TABLE 3

| | Hydrophobic treatment agent | Number of carbon atoms in the substituent group | Average primary particle diameter (nm) | SP value of treatment agent |
|---|---|---|---|---|
| Magnetic body fine particle 1 | n-decyltrimethoxysilane | 10 | 200 | 8.64 |
| Magnetic body fine particle 2 | n-hexyltrimethoxysilane | 6 | 200 | 8.69 |
| Magnetic body fine particle 3 | n-butyltrimethoxysilane | 4 | 200 | 8.74 |
| Magnetic body fine particle 4 | methyltrimethoxysilane | 1 | 200 | 8.94 |

The average primary particle diameter is the number-average primary particle diameter. The SP value of the treatment agent is the SP value for state in which it is bonded to the magnetic body, and the unit is $(cal/cm^3)^{0.5}$.

Organic/Inorganic Composite Particle Production Example

A 15-nm colloidal silica dispersion, methacryloxypropyltrimethoxysilane (MPS), and deionized water were introduced into a 250-mL four-neck roundbottom flask provided with a propeller-type stirrer, a hot water bath, and a thermometer and stirring was carried out. The amount of colloidal silica was adjusted to provide 67.0 mass % in the organic/inorganic composite fine particle.

The hot water bath was adjusted to 65° C. and stirring was performed for 30 minutes at 120 rpm under a nitrogen atmosphere. After 3 hours, 2,2'-azobisisobutyronitrile radical initiator dissolved in 10 mL ethanol was added to provide not more than 1 mass % with reference to the MPS, the temperature was raised to 75° C., and polymerization was carried out for 5 hours.

After the completion of the polymerization, 3 mL (2.3 g, 0.014 mole) of 1,1,1,3,3,3-hexamethyldisilazane (HMDZ) was added to the mixture and a treatment step was carried out for 3 hours. Aggregate lumps were removed by filtering the final mixture across a sieve, followed by drying overnight at 120° C. The product was crushed after drying to obtain the target organic/inorganic composite fine particle. The number-average particle diameter of the organic/inorganic composite fine particle was 106 nm.

Preparation of Colorant Dispersion Example

The following materials were mixed; stirring was carried out for 3 hours at 200 rpm with zirconia beads (3/16 inch) using an attritor (Mitsui Mining Co., Ltd.); and the beads were separated to obtain a colorant dispersion.

styrene37.5 parts colorant, Nipex 35 (carbon black from Orion Engineered Carbons LLC) 7.5 parts Toner 1 Production Example Preparation of Aqueous Medium 11.2 parts of sodium phosphate (dodecahydrate) was introduced into 390.0 parts of deionized water in a reactor and the temperature was held at 65° C. for 1.0 hour while purging with nitrogen. Stirring was carried out at 12,000 rpm using a T. K. Homomixer (Tokushu Kika Kogyo Co., Ltd.). While maintaining the stirring, an aqueous calcium chloride solution of 7.4 parts of calcium chloride (dihydrate) dissolved in 10.0 parts of deionized water was introduced all at once into the reactor to prepare an aqueous medium containing a dispersion stabilizer. 1.0 mol/L hydrochloric acid was introduced into the aqueous medium in the reactor to adjust the pH to 5.3, thus yielding an aqueous medium.

Toner Particle Production Example

Preparation of Polymerizable Monomer Composition styrene: 79.0 parts n-butyl acrylate: 15.0 parts lauryl acrylate: 6.0 parts hexanediol diacrylate: 0.5 parts polyester resin 1 (resin B-1): 3.0 parts sulfonic acid group-containing vinyl resin 1 (resin A-1): 1.0 parts magnetic body fine particle 1: 70.0 parts release agent (hydrocarbon wax, melting point: 79° C.): 5.0 parts plasticizer (behenyl stearate): 20.0 parts These materials were held at 65° C. and a polymerizable monomer composition was prepared by dissolving and dispersing to uniformity at 500 rpm using a T. K. Homomixer.

Granulation Step

While holding the temperature of the aqueous medium at 70° C. and the stirrer rotation rate at 12,500 rpm, the polymerizable monomer composition was introduced into the aqueous medium and 8.0 parts of the polymerization initiator t-butyl peroxypivalate was added. Granulation was performed for 10 minutes while maintaining 12,500 rpm with the stirrer.

Polymerization Step

The high-speed stirrer was replaced with a stirrer equipped with a propeller impeller and polymerization was carried out for 5.0 hours while maintaining 70° C. and stirring at 200 rpm. An additional polymerization reaction was run by raising the temperature to 85° C. and heating for 2.0 hours to obtain a resin particle dispersion containing a toner particle precursor.

Distillation Step

While maintaining stirring of the resin particle dispersion at 200 rpm, the resin particle dispersion was heated to 98° C. after the polymerization step, and a distillation step was carried out in which the residual monomer was removed by heating for 3.0 hours. A precursor dispersion was obtained in which the toner particle precursor was dispersed in an aqueous medium.

Heat Treatment Step

While maintaining stirring of the precursor dispersion at 200 rpm, the pH was adjusted to 8.1 by adding a 1.0 mol/L aqueous sodium carbonate solution to the resin particle dispersion after the distillation step. A heat treatment step was carried out in this state for 40 minutes at 98° C.

Crystallization Control Step

After the heat treatment step, the dispersion was cooled to 40° C. at a rate of 10° C./minute. Heating was then carried out to 55° C. and a crystallization control step was performed while maintaining the stirring and holding for 2.0 hours at 55° C. This was followed by cooling to 25° C.

Filtration, Washing, Drying, and Classification Step

After the crystallization control step, the dispersion stabilizer was dissolved by adjusting the pH of the dispersion to 1.5 with 1.0 mol/L hydrochloric acid and stirring for 1.5 hours. The resin particles were then separated by filtration and the ions attached to the toner particle surface were removed by washing three times with deionized water. This was followed by removal of the moisture by drying for 3 days in a dryer held at 40° C. The resulting powder was classified using a wind force classifier to obtain a toner particle 1.

Toner particle 1 had a number-average particle diameter (D1) of 6.8 μm and a weight-average particle diameter (D4) of 7.4 μm.

External Addition Step toner particle 1: 100.0 parts organic/inorganic composite fine particle: 0.5 parts These materials were mixed and an external addition and mixing treatment was performed by mixing for 9 minutes at 2970 rpm using an FM10C Henschel mixer (Nippon Coke & Engineering Co., Ltd. (formerly Mitsui Miike Chemical Engineering Machinery Co., Ltd.)).

hydrophobic silica fine particles (treated with dimethylsilicone oil) 0.5 parts strontium titanate fine particles (treated with stearic acid) 0.3 parts These materials were then introduced and a toner 1 was obtained by mixing for 5 minutes at 2970 rpm.

Toner 16 Production Example

Toner 16 was produced proceeding as in the Toner 1 Production Example, but changing the 79.0 parts of the styrene starting material in the polymerizable monomer composition preparation step in the Toner 1 Production Example to 38.5 parts of styrene, omitting the magnetic body fine particle, omitting the plasticizer, and further adding 45.0 parts of the colorant dispersion. The n-butyl acrylate and lauryl acrylate were also changed as shown in Table 4.

Toner 17 Production Example

Toner 17 was produced proceeding as in the Toner 16 Production Example, but further adding 20.0 parts of the plasticizer in the Toner 16 Production Example and changing the conditions in the heat treatment step as indicated in Table 4.

Toner 23 Production Example

A pulverized toner was produced using the following method.

polyester resin 1 (resin B-1): 30.0 parts sulfonic acid group-containing vinyl resin 1 (resin A-1): 70.0 parts colorant, Nipex 35 (carbon black from Orion Engineered Carbons LLC) 7.5 parts release agent (hydrocarbon wax, melting point: 79° C.): 5.0 parts These materials were pre-mixed using an FM10C Henschel mixer (Nippon Coke & Engineering Co., Ltd. (formerly Mitsui Miike Chemical Engineering Machinery Co., Ltd.)) followed by melt-kneading with a twin-screw kneader (Model PCM-30, Ikegai Ironworks Corporation) to obtain a kneaded material. The obtained kneaded material was cooled and coarsely pulverized using a hammer mill (Hosokawa Micron Corporation) and then pulverized using a mechanical pulverizer (T-250, Turbo Kogyo Co., Ltd.) to obtain a finely pulverized powder. The obtained finely pulverized powder was classified using a Coanda effect-based multi-grade classifier (Model EJ-L-3, Nittetsu Mining Co., Ltd.) to obtain a toner particle. The same external addition step as in the Toner 1 Production Example was carried out on the resulting toner particle to produce toner 23.

Toners 2 to 15 and 18 to 22 Production Example

Toners 2 to 15 and 18 to 22 were obtained proceeding as in the Toner 1 Production Example, but changing the starting materials in the Toner 1 Production Example as indicated in Table 4. The properties of toners 1 to 23 are given in Table 5 and Table 6.

TABLE 4

| | Styrene | BA | LA | ResinA | Resin B | Amount of Resin A (parts) | Amount of Resin B (parts) | Magnetic body fine particle No |
|---|---|---|---|---|---|---|---|---|
| Toner 1 | 79 | 15 | 6 | A-1 | B-1 | 1.0 | 3.0 | 1 |
| Toner 2 | 79 | 15 | 6 | A-1 | B-1 | 1.0 | 3.0 | 3 |
| Toner 3 | 79 | 15 | 6 | A-1 | B-1 | 1.5 | 3.0 | 1 |
| Toner 4 | 79 | 15 | 6 | A-1 | B-1 | 0.5 | 3.0 | 1 |
| Toner 5 | 79 | 15 | 6 | A-2 | B-1 | 1.0 | 3.0 | 1 |
| Toner 6 | 79 | 15 | 6 | A-1 | B-2 | 1.0 | 3.0 | 1 |
| Toner 7 | 79 | 15 | 6 | A-1 | B-3 | 1.0 | 3.0 | 1 |
| Toner 8 | 79 | 15 | 6 | A-1 | B-1 | 1.0 | 3.0 | 2 |
| Toner 9 | 79 | 15 | 6 | A-1 | B-4 | 1.0 | 3.0 | 2 |
| Toner 10 | 79 | 15 | 6 | A-1 | B-5 | 1.0 | 3.0 | 2 |
| Toner 11 | 79 | 15 | 6 | A-3 | B-1 | 1.0 | 3.0 | 2 |
| Toner 12 | 79 | 15 | 6 | A-4 | B-1 | 1.0 | 3.0 | 2 |
| Toner 13 | 79 | 15 | 6 | A-1 | B-1 | 1.0 | 3.0 | 4 |
| Toner 14 | 79 | 15 | 6 | A-1 | B-1 | 1.0 | 3.0 | 4 |
| Toner 15 | 76 | 24 | 0 | A-1 | B-1 | 1.0 | 3.0 | 4 |
| Toner 16 | 76 | 24 | 0 | A-1 | B-1 | 1.0 | 3.0 | — |
| Toner 17 | 76 | 24 | 0 | A-1 | B-1 | 1.0 | 3.0 | — |
| Toner 18 | 76 | 24 | 0 | A-1 | B-1 | 1.0 | 3.0 | 3 |
| Toner 19 | 76 | 24 | 0 | — | B-1 | 0.0 | 4.0 | 3 |
| Toner 20 | 76 | 24 | 0 | A-1 | — | 1.0 | 0.0 | 3 |
| Toner 21 | 76 | 24 | 0 | A-1 | B-1 | 1.0 | 3.0 | 3 |
| Toner 22 | 76 | 24 | 0 | A-2 | B-6 | 1.0 | 3.0 | 3 |
| Toner 23 | — | — | — | A-1 | B-1 | 70.0 | 30.0 | — |

TABLE 4-continued

| | Plasticizer | Plasticizer (parts) | Long-chain acrylate | Treatment temperature ° C. | Treatment pH | Treatment time (min) |
|---|---|---|---|---|---|---|
| Toner 1 | BS | 20.0 | LA | 98 | 8.1 | 40 |
| Toner 2 | BS | 20.0 | LA | 98 | 8.1 | 40 |
| Toner 3 | BS | 20.0 | LA | 98 | 8.1 | 40 |
| Toner 4 | BS | 20.0 | LA | 98 | 8.1 | 40 |
| Toner 5 | BS | 20.0 | LA | 98 | 8.1 | 40 |
| Toner 6 | BS | 20.0 | LA | 98 | 8.1 | 40 |
| Toner 7 | BS | 20.0 | LA | 98 | 8.1 | 40 |
| Toner 8 | BS | 20.0 | LA | 98 | 8.1 | 40 |
| Toner 9 | BS | 20.0 | LA | 98 | 8.1 | 40 |
| Toner 10 | BS | 20.0 | LA | 98 | 8.1 | 40 |
| Toner 11 | BS | 20.0 | LA | 98 | 8.1 | 40 |
| Toner 12 | BS | 20.0 | LA | 98 | 8.1 | 40 |
| Toner 13 | BS | 20.0 | LA | 98 | 8.1 | 40 |
| Toner 14 | — | 0.0 | LA | 98 | 8.1 | 40 |
| Toner 15 | — | 0.0 | BA | 98 | 8.1 | 40 |
| Toner 16 | — | 0.0 | BA | 98 | 8.1 | 40 |
| Toner 17 | BS | 20.0 | BA | 96 | 7.6 | 5 |
| Toner 18 | BS | 20.0 | BA | 98 | 5.2 | 0 |
| Toner 19 | BS | 20.0 | BA | 98 | 8.1 | 40 |
| Toner 20 | BS | 20.0 | BA | 98 | 8.1 | 40 |
| Toner 21 | BS | 20.0 | BA | 90 | 8.5 | 60 |
| Toner 22 | BS | 20.0 | BA | 98 | 8.1 | 40 |
| Toner 23 | — | 0.0 | — | — | — | — |

In the table, the numerical values for styrene, BA, and LA indicate the number of parts. The treatment temperature, treatment pH, and treatment time indicate the conditions in the heat treatment step.

The following abbreviations are used.
BS: behenyl stearate
LA: lauryl acrylate
BA: butyl acrylate

TABLE 5

| | Resin A | Resin B | CA5 | CA75 | CBS | CB75 | CAS/CA75 | CBS/CB75 | CAS/CBS | (CAS/CBS)/ (CA75/CB75) |
|---|---|---|---|---|---|---|---|---|---|---|
| Toner 1 | Y | Y | 70.0 | 16.8 | 30.0 | 13.2 | 4.2 | 2.3 | 2.3 | 1.8 |
| Toner 2 | Y | Y | 84.2 | 23.7 | 15.8 | 8.5 | 3.6 | 1.9 | 5.3 | 1.9 |
| Toner 3 | Y | Y | 84.0 | 25.0 | 16.0 | 8.0 | 3.4 | 2.0 | 5.3 | 1.7 |
| Toner 4 | Y | Y | 50.0 | 20.0 | 50.0 | 30.0 | 2.5 | 1.7 | 1.0 | 1.5 |
| Toner 5 | Y | Y | 55.0 | 30.0 | 45.0 | 25.0 | 1.8 | 1.8 | 1.2 | 1.0 |
| Toner 6 | Y | Y | 65.0 | 15.0 | 35.0 | 7.5 | 4.3 | 4.7 | 1.9 | 0.9 |
| Toner 7 | Y | Y | 75.0 | 17.0 | 25.0 | 15.0 | 4.4 | 1.7 | 3.0 | 2.6 |
| Toner 8 | Y | Y | 77.0 | 20.0 | 23.0 | 10.0 | 3.9 | 2.3 | 3.3 | 1.7 |
| Toner 9 | Y | Y | 77.0 | 20.0 | 23.0 | 10.0 | 3.9 | 2.3 | 3.3 | 1.7 |
| Toner 10 | Y | Y | 77.0 | 20.0 | 23.0 | 10.0 | 3.9 | 2.3 | 3.3 | 1.7 |
| Toner 11 | Y | Y | 77.0 | 20.0 | 23.0 | 10.0 | 3.9 | 2.3 | 3.3 | 1.7 |
| Toner 12 | Y | Y | 77.0 | 20.0 | 23.0 | 10.0 | 3.9 | 2.3 | 3.3 | 1.7 |
| Toner 13 | Y | Y | 84.2 | 23.7 | 15.8 | 8.5 | 3.6 | 1.9 | 5.3 | 1.9 |
| Toner 14 | Y | Y | 84.2 | 23.7 | 15.8 | 8.5 | 3.6 | 1.9 | 5.3 | 1.9 |
| Toner 15 | Y | Y | 84.2 | 23.7 | 15.8 | 8.5 | 3.6 | 1.9 | 5.3 | 1.9 |
| Toner 16 | Y | Y | 84.2 | 23.7 | 15.8 | 8.5 | 3.6 | 1.9 | 5.3 | 1.9 |
| Toner 17 | Y | Y | 78.0 | 21.0 | 13.0 | 8.6 | 3.7 | 1.5 | 6.0 | 2.5 |
| Toner 18 | Y | Y | 74.2 | 14.2 | 10.8 | 8.6 | 5.2 | 1.3 | 6.9 | 4.2 |
| Toner 19 | N | Y | 0.0 | | 100.0 | | — | — | — | — |
| Toner 20 | Y | N | 100.0 | | 0.0 | | — | — | — | — |
| Toner 21 | Y | Y | 87.3 | 16.7 | 12.7 | 10.1 | 5.2 | 1.3 | 6.9 | 4.2 |
| Toner 22 | Y | Y | 45.0 | 14.2 | 55.0 | 10.0 | 3.2 | 5.5 | 0.8 | 0.6 |
| Toner 23 | Y | Y | 70.0 | 70.0 | 30.0 | 30.0 | 1.0 | 1.0 | 2.3 | 1.0 |

In the columns for the resin A and the resin B, the incorporation of the particular resin is indicated with a Y and the absence of the particular resin is indicated by an N.

removed from within the cartridge, which, after cleaning with an air blower, was filled with 165 g of the toner to be evaluated.

TABLE 6

| | Inorganic fine particle | Long-chain alkyl treatment | Magnetic body | Wax structure | Amount of surface wax | Resin C | Long-chain acrylate |
|---|---|---|---|---|---|---|---|
| Toner 1 | Y | 10 | Y | behenyl stearate | 0 | Y | C12 |
| Toner 2 | Y | 4 | Y | behenyl stearate | 0 | Y | C12 |
| Toner 3 | Y | 10 | Y | behenyl stearate | 0 | Y | C12 |
| Toner 4 | Y | 10 | Y | behenyl stearate | 0 | Y | C12 |
| Toner 5 | Y | 10 | Y | behenyl stearate | 0 | Y | C12 |
| Toner 6 | Y | 10 | Y | behenyl stearate | 0 | Y | C12 |
| Toner 7 | Y | 10 | Y | behenyl stearate | 0 | Y | C12 |
| Toner 8 | Y | 6 | Y | behenyl stearate | 0 | Y | C12 |
| Toner 9 | Y | 6 | Y | behenyl stearate | 0 | Y | C12 |
| Toner 10 | Y | 6 | Y | behenyl stearate | 0 | Y | C12 |
| Toner 11 | Y | 6 | Y | behenyl stearate | 0 | Y | C12 |
| Toner 12 | Y | 6 | Y | behenyl stearale | 0 | Y | C12 |
| Toner 13 | Y | 1 | Y | behenyl stearate | 0 | Y | C12 |
| Toner 14 | Y | 1 | Y | hydrocarbon | 0 | Y | C12 |
| Toner 15 | Y | 1 | Y | hydrocarbon | 0 | Y | C4 |
| Toner 16 | N | 0 | N | hydrocarbon | 0 | Y | C4 |
| Toner 17 | N | 0 | N | behenyl stearate | 9 | Y | C4 |
| Toner 18 | Y | 4 | Y | behenyl stearate | 15 | Y | C4 |
| Toner 19 | Y | 4 | Y | bahenyl stearate | 0 | Y | C4 |
| Toner 20 | Y | 4 | Y | behenyl stearate | 0 | Y | C4 |
| Toner 21 | Y | 4 | Y | behenyl stearate | 0 | Y | C4 |
| Toner 22 | Y | 4 | Y | behenyl stearate | 0 | Y | C4 |
| Toner 23 | N | — | N | hydrocarbon | | N | — |

In the column for the inorganic fine particle, the incorporation of the inorganic fine particle is indicated with a Y and the absence of the inorganic fine particle is indicated by an N.

The "long-chain alkyl treatment" column gives the number of carbon atoms in the alkyl group in the surface treatment agent for the magnetic body.

In the magnetic body column, the incorporation of the magnetic body fine particle is indicated with a Y and the absence thereof is indicated by an N.

The "amount of surface wax" in the table is the abundance $CW_S$ (%) of the ester wax at the depth DA.

In the column for the resin C, the incorporation of the resin C is indicated with a Y and the absence thereof is indicated by an N.

The "long-chain acrylate" gives the number of carbon atoms in the alkyl group corresponding to $R^2$ in the monomer unit represented by formula (1).

Examples 1 to 17 and Comparative Examples 1 to 6

Evaluations shown in Table 7 were performed using toners 1 to 23. Toners 1 to 17 are used in Examples 1 to 17, and toners 18 to 23 are used in Comparative Examples 1 to 6, respectively. The results of the evaluations are given in Table 7.

The evaluation methods and evaluation criteria are described in the following.

A modified version of an LBP-712Ci (Canon, Inc.) commercial laser printer was used as the image-forming apparatus. This was modified by deleting the warm-up operation and by providing a process speed of 300 mm/sec. A 040H toner cartridge (black) (Canon, Inc.), which is a commercial process cartridge, was used. The production toner was removed at each of the yellow, magenta, and cyan stations, and the evaluations were performed with the yellow, magenta, and cyan cartridges installed, but with the remaining toner amount detection mechanisms inactivated.

Transferability

The aforementioned image-forming apparatus and toner cartridge were held at quiescence for 48 hours in a high-temperature, high-humidity environment (32.5° C./80% RH, abbreviated as the HH environment in the following). Ten prints of a density check image (solid image) were then continuously output and the image density was checked on the tenth print.

An X-RITE (X-Rite, Incorporated) was used to check the image density.

A: the image density is at least 1.50

B: the image density is at least 1.45, but less than 1.50

C: the image density is at least 1.40, but less than 1.45

D: the image density is less than 1.40

Charge Rise After Standing at High Temperature

After the evaluation of the transferability, 1,000 prints were output of an image having a print percentage of 1%. This was followed by standing at quiescence for another 48 hours in the HH environment. Ten prints of a density check image (solid image) were then continuously output and the image density was checked.

A: an image density of 1.30 or more was obtained from the first print

B: an image density of 1.30 or more was obtained from the second or third print

C: an image density of 1.30 or more was obtained at the fourth to tenth print

D: the image density was less than 1.30 even at the tenth print

Durability 14,000 prints of an image with a print percentage of 1% were output subsequent to the evaluation of the charge rise after standing at high temperature. A density check image (solid image) was then output and the image density was checked.

A: the image density is at least 1.40

B: the image density is at least 1.35, but less than 1.40

C: the image density is at least 1.30, but less than 1.35

D: the image density is less than 1.30

Fixing Performance

The aforementioned image-forming apparatus and toner cartridge were held at quiescence for 48 hours in a low-temperature, low-humidity environment (15° C./10% RH, abbreviated as the LL environment in the following). A density check image (solid image) was then output while changing the fixation temperature and the fixation temperature was checked. The fixation temperature was taken to be the lowest temperature at which cold offset was not produced, and was evaluated using the following criteria.

A: the fixation temperature is less than 170° C.

B: the fixation temperature is at least 170° C., but less than 180° C.

C: the fixation temperature is at least 180° C., but less than 190° C.

D: the fixation temperature is at least 190° C.

Electrostatic Sticking

The aforementioned image-forming apparatus and toner cartridge were held at quiescence for 48 hours in a low-temperature, low-humidity environment (15° C./10% RH, abbreviated as the LL environment in the following). Ten prints of a solid image were then continuously output and the image sticking was checked.

A: sticking is not observed

B: very slight sticking is observed

C: sticking is observed

D: sticking occurs and detachment is difficult

TABLE 7

| | Charge rise after standing at high temperature | | Durability | | Transferability | | Fixing performance | | Electrostatic sticking |
|---|---|---|---|---|---|---|---|---|---|
| Example 1 | A | 1st print | A | 1.46 | A | 1.53 | A | 160° C. | A |
| Example 2 | B | 2nd print | A | 1.42 | A | 1.50 | A | 165° C. | A |
| Example 3 | A | 1st print | A | 1.44 | A | 1.51 | A | 160° C. | A |
| Example 4 | A | 1st print | A | 1.44 | A | 1.51 | A | 160° C. | A |
| Example 5 | B | 2nd print | A | 1.46 | A | 1.53 | A | 160° C. | A |
| Example 6 | A | 1st print | A | 1.45 | A | 1.52 | A | 160° C. | A |
| Example 7 | A | 1st print | A | 1.45 | A | 1.52 | A | 160° C. | A |
| Example 8 | A | 1st print | A | 1.43 | A | 1.50 | A | 165° C. | A |
| Example 9 | A | 1st print | A | 1.45 | A | 1.52 | A | 160° C. | A |
| Example 10 | A | 1st print | A | 1.46 | A | 1.53 | A | 160° C. | A |
| Example 11 | A | 1st print | A | 1.44 | A | 1.51 | A | 160° C. | A |
| Example 12 | A | 1st print | A | 1.45 | A | 1.52 | A | 160° C. | A |
| Example 13 | B | 3rd print | A | 1.40 | A | 1.51 | B | 170° C. | A |
| Example 14 | B | 3rd print | A | 1.41 | A | 1.51 | C | 180° C. | B |
| Example 15 | B | 3rd print | A | 1.40 | A | 1.51 | C | 185° C. | C |
| Example 16 | B | 3rd print | C | 1.34 | A | 1.50 | C | 180° C. | C |
| Example 17 | C | 8th print | C | 1.31 | C | 1.41 | B | 175° C. | C |
| Comparative Example 1 | D | 12th print | C | 1.32 | D | 1.38 | A | 165° C. | C |
| Comparative Example 2 | D | 15th print | A | 1.42 | A | 1.51 | A | 165° C. | C |
| Comparative Example 3 | D | 17th print | A | 1.42 | A | 1.52 | A | 165° C. | C |
| Comparative Example 4 | D | 12th print | C | 1.32 | A | 1.51 | A | 165° C. | C |
| Comparative Example 5 | D | 16th print | D | 1.28 | C | 1.42 | C | 180° C. | D |
| Comparative Example 6 | D | 12th print | C | 1.32 | D | 1.37 | A | 165° C. | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-124456, filed Aug. 4, 2022, and Japanese Patent Application No. 2023-114334, filed Jul. 12, 2023, which are hereby incorporated by reference herein in their entirety.

What is claimed is:

1. A toner, comprising:

a toner particle comprising a resin A and a resin B;

resin A comprising a vinyl resin having at least one sulfonic acid-type group selected from the group consisting of a sulfonic acid group, a sulfonate salt group and a sulfonate ester group; and resin B comprising a polyester resin, wherein when in analysis in a depth direction of the toner particle using time-of-flight secondary ion mass spectrometry $CA_S$ is 40.0 to 85.0, $CA_S/CA_{75}$ is 1.5 to 5.0, $CB_S/CB_{75}$ is 1.5 to 5.0, $CA_S/CB_S$ is 1.0 to 6.0, and $(CA_S/CB_S)/(CA_{75}/CB_{75})$ is 0.5 to 3.0 when DA (nm) is a depth at which an abundance of the resin A in a depth of 10 nm from a toner particle surface is a maximum, $CA_S$ (%) is an abundance of the resin A at the depth DA and $CB_S$ (%) is an abundance of the resin B at the depth DA, in each case calculated from a spectrum for the depth DA, $CA_{75}$(%) is an abundance of the resin A at a depth of 75 nm and $CB_{75}$(%) is an abundance of the resin B at a depth of 75 nm, in both cases calculated from a spectrum for a depth of 75 nm.

2. The toner according to claim 1, wherein $CA_S/CA_{75}$ is 2.0 to 5.0.

3. The toner according to claim 1, wherein the toner particle comprises an inorganic fine particle.

4. The toner according to claim 3, wherein the inorganic fine particle is a surface-treated material provided by a treatment agent having an alkyl group having 4 to 20 carbon atoms.

5. The toner according to claim 3, wherein the inorganic fine particle is a magnetic body.

6. The toner according to claim 1, wherein the toner particle comprises an ester wax comprising at least one compound selected from the group consisting of compounds represented by formulae (4), (5) and (6)

(4)

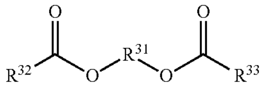

(5)

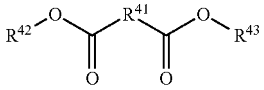

(6)

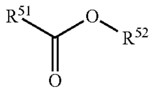

where $R^{31}$ and $R^{41}$ independently represent an alkylene group having 2 to 8 carbon atoms, and $R^{32}$, $R^{33}$, $R^{42}$, $R^{43}$, $R^{51}$ and $R^{52}$ independently represent a straight-chain alkyl group having 14 to 24 carbon atoms, and an abundance $CW_S$ (%) of the ester wax at the depth DA in analysis of the toner particle in the depth direction by time-of-flight secondary ion mass spectrometry is not more than 10.

7. The toner according to claim 1, wherein the toner particle comprises a resin C which is a vinyl resin that does not have a sulfonic acid-type group.

8. The toner according to claim 7, wherein resin C has a monomer unit represented by formula (1)

(1)

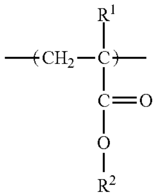

where $R^1$ represents a hydrogen atom or a methyl group, and $R^2$ represents a straight-chain alkyl group having 10 to 14 carbon atoms.

9. The toner according to claim 1, wherein resin B has an ester group concentration of is 2.0 to 10.0 mmol/g.

10. The toner according to claim 1, wherein resin A has a concentration of the sulfonic acid-type group of 0.05 to 0.50 mmol/g.

11. The toner according to claim 1, wherein resin A is an amorphous resin, and resin B is an amorphous resin.

12. A toner production method for producing a toner comprising a toner particle comprising a resin A and a resin B;

resin A comprising a vinyl resin having at least one sulfonic acid-type group selected from the group consisting of a sulfonic acid group, a sulfonate salt group and a sulfonate ester group; and resin B comprising a polyester resin, wherein when in analysis in a depth direction of the toner particle using time-of-flight secondary ion mass spectrometry $CA_S$ is 40.0 to 85.0, $CA_S/CA_{75}$ is 1.5 to 5.0, $CB_S/CB_{75}$ is 1.5 to 5.0, $CA_S/CB_S$ is 1.0 to 6.0, and $(CA_S/CB_S)/(CA_{75}/CB_{75})$ is 0.5 to 3.0 when DA (nm) is a depth at which an abundance of the resin A in a depth of 10 nm from a toner particle surface is a maximum, $CA_S$ (%) is an abundance of the resin A at the depth DA and $CB_S$ (%) is an abundance of the resin B at the depth DA, in each case calculated from a spectrum for the depth DA, $CA_{75}$(%) is an abundance of the resin A at a depth of 75 nm and $CB_{75}$(%) is an abundance of the resin B at a depth of 75 nm, in both cases calculated from a spectrum for a depth of 75 nm, the toner production method comprising a heat treatment step of subjecting a toner particle precursor comprising the resin A and the resin B to treatment for at least 10 minutes in an aqueous medium at a pH of 7.5 to 10.0 at a temperature of 95 to 120° C.

13. The toner production method according to claim 12, wherein the toner particle precursor comprises an inorganic fine particle.

14. The toner production method according to claim 13, wherein the inorganic fine particle is a surface-treated material provided by a treatment agent having an alkyl group having 4 to 20 carbon atoms.

15. The toner production method according to claim 13, wherein the inorganic fine particle is a magnetic body.

16. The toner according to claim 1, wherein $CB_S$ is 14.0 to 50.0.

17. The toner according to claim 1, wherein the toner comprises an external additive comprising an organic/inorganic composite fine particle.

* * * * *